(12) United States Patent
Hashima

(10) Patent No.: US 6,272,237 B1
(45) Date of Patent: *Aug. 7, 2001

(54) IMAGE PROCESSING APPARATUS

(75) Inventor: Masayoshi Hashima, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/661,828

(22) Filed: Jun. 11, 1996

(30) Foreign Application Priority Data

Oct. 11, 1995 (JP) .................................................. 7-262712

(51) Int. Cl.⁷ ................................ G06K 9/00; H04N 7/00
(52) U.S. Cl. ........................... 382/153; 382/154; 348/113; 348/119
(58) Field of Search ..................................... 382/153, 104, 382/103, 106, 107; 364/424.1, 461; 340/905, 901, 435, 436, 937; 348/116, 113, 118, 119, 148, 42

(56) References Cited

U.S. PATENT DOCUMENTS

| 4,868,752 | * | 9/1989 | Fujii et al. ............................ 382/153 |
| 5,307,419 | * | 4/1994 | Tsujino et al. ........................ 382/100 |
| 5,386,285 | * | 1/1995 | Asayama ................................. 356/1 |
| 5,410,346 | * | 4/1995 | Saneyoshi et al. .................... 348/116 |
| 5,486,819 | * | 1/1996 | Horie ................................... 340/905 |
| 5,535,144 | * | 7/1996 | Kise ..................................... 364/561 |

FOREIGN PATENT DOCUMENTS 63-158619    7/1988   (JP) ................................. G05D/1/02

* cited by examiner

*Primary Examiner*—Jose L. Couso
*Assistant Examiner*—Duy M. Dang
(74) *Attorney, Agent, or Firm*—Staas & Halsey LLP

(57) ABSTRACT

An image processing apparatus for extracting a floor region and an obstacle region from an image formed by pixels taken by a camera, includes an image dividing unit to divide the image into a plurality of regions; an arithmetic unit to calculate the absolute value of the difference between the density of each pixel of each region and a set density and to accumulate the absolute value for each region; a floor/obstacle judging portion to judge whether a target region is a floor region or an obstacle region on the basis of the result of comparison between a set value and the accumulated value of the absolute values for all the pixels within the target region or the average value of the accumulated value obtained by dividing the accumulated value by the number of pixels; and a storage portion to store the result of the floor/obstacle judging portion.

15 Claims, 17 Drawing Sheets

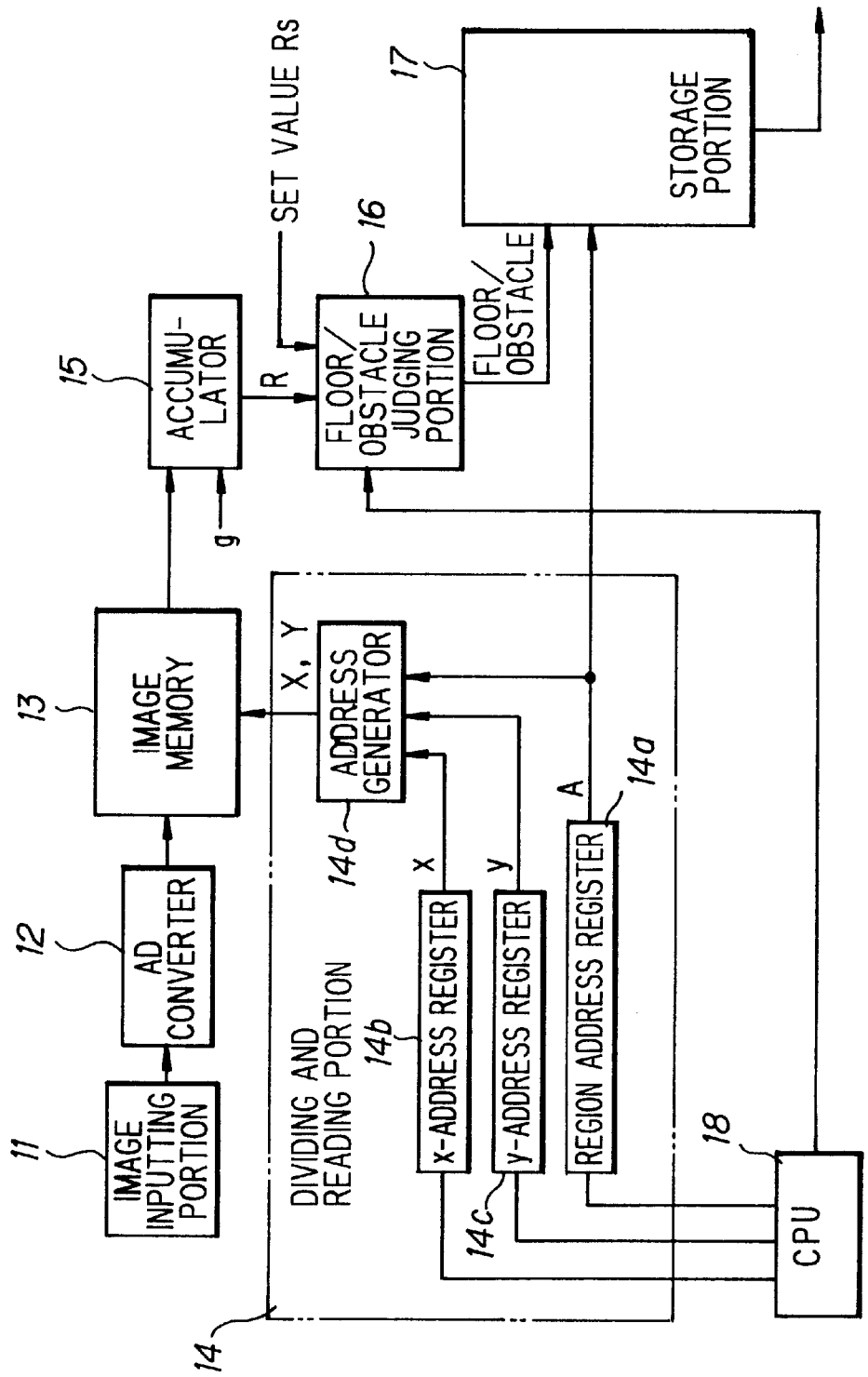

Sx=63, Sy=63

IMAGE PROCESSING APPARATUS

BACKGROUND OF THE INVENTION

FIELD OF THE INVENTION

The present invention relates to an image processing apparatus and, more particularly, to an image processing apparatus for extracting a floor region and an obstacle region from an image taken by a camera.

In medical and welfare facilities such as hospitals and nursing homes, there is a demand for the development of robots (self-propelled carriage, automatic guided vehicle, autonomous mobile robot, etc.) which automatically carry meals, washing, etc. There is also a demand for the development of self-propelled carriages used in office buildings, schools, factories, etc. and on the road or the like.

When a robot works, it is necessary to detect an obstacle in its travel range. As a method of detecting an obstacle, detection methods using an ultrasonic sensor, an optical range sensor or the like have conventionally been proposed. These methods, however, suffer from the following problems. Since a distance is measured by the ultrasonic wave or light reflected from an object, some attitude of the surface of an object or some reflection characteristic of an object makes the measurement of a distance impossible. In addition, an ultrasonic sensor has a poor spatial resolution. On the other hand, in the case of using an optical range sensor, since a wide range is measured with a high accuracy, it is necessary to use a high-output laser, which causes an apprehension as to the safety.

In contrast, there is provided a method of detecting an obstacle from an image taken by a camera. According to this method, a part in which there is a large change in the density is extracted from the image as an obstacle. Therefore, this method is free from the above-described problems of an ultrasonic sensor or an optical range sensor.

In a conventional detection method using an image taken by a camera, however, since a part in which there is a large change in the density is extracted from an image, such a large amount of computation is necessary that it is impossible to extract an obstacle in a short time.

SUMMARY OF THE INVENTION

Accordingly, it is an object of the present invention to eliminate the above-described problems in the related art and to provide an image processing apparatus which is capable of extracting a floor region and an obstacle region from an image taken by a camera at a high speed.

To achieve this end, in one aspect of the present invention, there is provided an image processing apparatus for extracting a floor region and an obstacle region from an image taken by a camera, comprising: an image dividing means for dividing the image into a plurality of regions; an arithmetic unit for calculating the absolute value of the difference between the density of each pixel of each region and a set density and accumulating the absolute value for each region; a floor/obstacle judging portion for judging whether a target region is a floor region or an obstacle region on the basis of the result of comparison between a set value and the accumulated value of the absolute values for all the pixels within the target region or the average value of the accumulated value obtained by dividing the accumulated value by the number of pixels; and a storage portion for storing the result of the judgement.

In another aspect of the present invention, there is provided an image processing apparatus for extracting a floor region and an obstacle region from an image taken by a camera, comprising: an image dividing means for dividing the image into a plurality of regions; an average density calculator for calculating the average density of each region by dividing the accumulated value of the densities for all pixels in each region by the number of pixels; an arithmetic unit for calculating the absolute value of the difference between the density of each pixel of each region and the average density of the corresponding region and accumulating the absolute value; a floor/obstacle judging portion for judging whether a target region is a floor region or an obstacle region on the basis of the result of comparison between a set value and the accumulated value of the absolute values for all the pixels within the target region or the average value of the accumulated value obtained by dividing the accumulated value by the number of pixels; and a storage portion for storing the result of the judgement.

Other features and advantages of the present invention will be apparent from the following description taken in conjunction with the accompanying drawings.

BRIEF DESCRIPTION OF THE DRAWINGS

FIG. 6 shows a first embodiment of an image processing apparatus according to the present invention;

DESCRIPTION OF THE PREFERRED EMBODIMENTS

Figure 1:
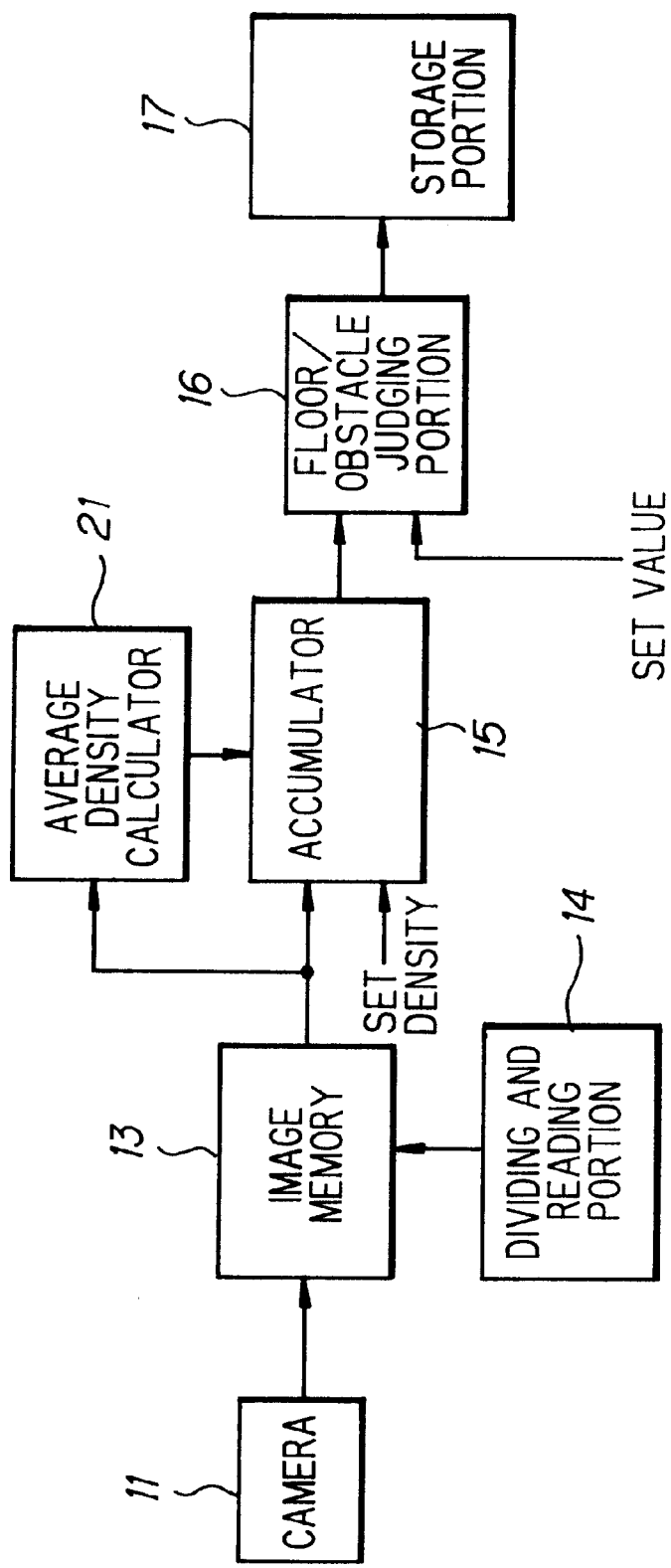
FIG. 1 schematically explains the structure of the present invention.

FIG. 1 schematically explains the structure of the present invention. In FIG. 1, the reference numeral 11 represent a camera, 13 an image memory for storing an image taken by the camera, 14 a dividing and reading portion for dividing the image into a plurality of regions and outputting pixel data (density data) of each region, 15 an accumulator for calculating the absolute value of the difference between the density of each pixel of each region and a set density and accumulating the absolute value for each region, 16 a floor/obstacle judging portion for judging whether a target region is a floor region or an obstacle region on the basis of the result of comparison between a set value and the accumulated value of the absolute values for all the pixels within the target region or the average value of the accumulated value obtained by dividing the accumulated value by the number of pixels, and 17 a storage portion for storing the result of the judgement. The reference numeral 21 represents an average density calculator for calculating the average density of each region.

An image, which is taken by the camera 11 and stored in the image memory 13, is divided into a plurality of regions and the density data of each pixel in each region is read and input to the accumulator 15 by the dividing and reading portion 14. The accumulator 15 calculates the absolute value of the difference between the density data of each pixel and a set density (e.g., density 0) and accumulates the absolute value. The floor/obstacle judging portion 16 compares a set value with the accumulated value of the absolute values for all the pixels within a target region or the average value of the accumulated value obtained by dividing the accumulated value by the number of pixels and judges whether the target region is a floor region or an obstacle region on the basis of the result of the comparison. The result of the judgement is stored in the storage portion 17. According to the above-described structure of the image processing apparatus, simple processing enables a floor region and an obstacle region to be extracted at a high speed from an image taken by a camera.

In this case, the floor/obstacle judging portion 16 compares the set value with the accumulated value of the densities every time the accumulated value is obtained, and when the accumulated value is larger than the set value, the floor/obstacle judging portion 16 judges that the target region is a floor region. On the other hand, when the accumulated value of absolute values for all the pixels is smaller than the set value, the floor/obstacle judging portion 16 judges that the target region is an obstacle region. If the region is judged to be a floor region, the accumulator 15 immediately begins accumulation for the next region. In this manner, the amount of computation is reduced, so that it is possible to extract a floor region/obstacle region at a higher speed.

An image which is taken by the camera 11 and stored in the image memory 13 is divided into a plurality of regions and the density data of each pixel in each region is read and output. The average density calculator 21 calculates the average density of each region by dividing the accumulated value of the density data for all the pixels in each region by the number of pixels, and the accumulator 15 calculates the absolute value of the difference between the density of each pixel and the average density of the corresponding region and accumulates the absolute value for each region. The floor/obstacle judging portion 16 compares a set value with the accumulated value of the absolute values for all the pixels within a target region or the average value of the accumulated value obtained by dividing the accumulated value by the number of pixels and judges whether the target region is a floor region or an obstacle region on the basis of the result of the comparison. The result of the judgement is stored in the storage portion 17. According to the above-described structure of the image processing apparatus, simple processing enables a floor region and an obstacle region to be extracted at a high speed from an image taken by a camera.

In this case, the floor/obstacle judging portion 16 compares the set value with the accumulated value of each difference between the density of a pixel and the average density every time the accumulated value of the difference is obtained, and when the accumulated value is larger than the set value, the floor/obstacle judging portion 16 judges that the target region is an obstacle region. On the other hand, when the accumulated value of absolute values for all the pixels is smaller than the set value, the floor/obstacle judging portion 16 judges that the target region is a floor region. If the region is judged to be an obstacle region, the accumulator 15 immediately begins accumulation for the next region. In this manner, the amount of computation is reduced, so that it is possible to extract a floor region and an obstacle region at a high speed.

An image memory is divided into a plurality of regions and each region is further divided into a plurality of subregions. When a target region is judged to be a floor region as a result of floor/obstacle region judgement, all the subregions that constitute the target region are judged to be floor regions. On the other hand, when a target region is judged to be an obstacle region, the floor/obstacle region judgement process is executed for each subregion which constitutes the target region. In this manner, it is possible to extract a floor region and an obstacle region at a higher speed in proportion to the areal ratio of a floor region in an image.

Further, the accumulator 15 thins the pixels in the target region which are used for the calculation of the accumulated value in the floor/obstacle judgement process for the target region. In this manner, the amount of computation is reduced, so that it is possible to extract a floor region and an obstacle region at a high speed.

Figure 2:
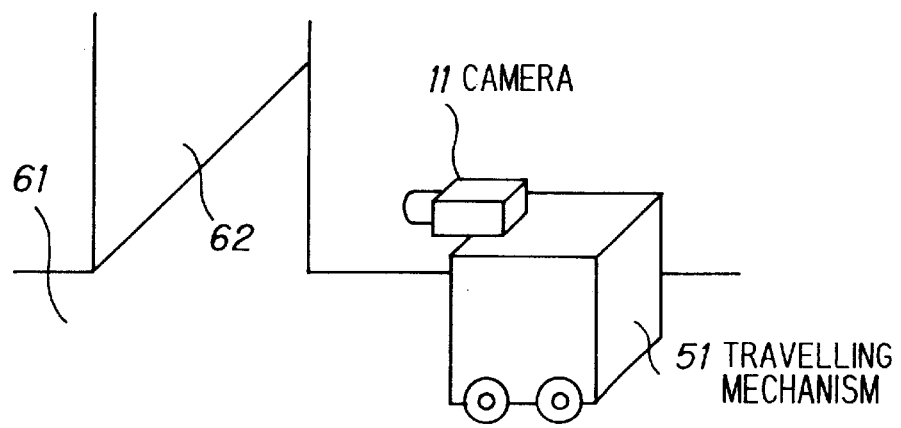
FIG. 2 is an external view of a robot.
Figure 3:
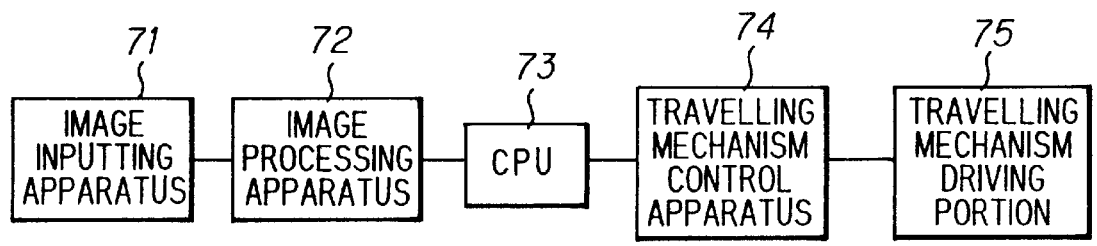
FIG. 3 shows the structure of a robot control apparatus.

FIG. 2 is an external view of a robot such as a self-propelled carriage and an automatic guided vehicle to which the present invention is applicable. In FIG. 2, the reference numeral 11 represents a camera, 51 a travelling mechanism, 61 a floor on which the robot travels, and 62 an obstacle (wall). FIG. 3 shows the structure of a robot control apparatus provided within the robot. In FIG. 3, the reference numeral 71 represents an image inputting apparatus such as a camera, 72 an image processing apparatus for extracting a floor and an obstacle from an image taken by the camera 71, 73 a processor (CPU) for determining the travel route of the robot on the basis of the floor/obstacle region data extracted by the image processing apparatus 72, 74 a travelling mechanism control apparatus for controlling the travel of the robot on the basis of the travel route data, and 75 a travelling mechanism driving portion for moving the robot on the basis of the command from the travelling mechanism control apparatus 74.

Figure 4:
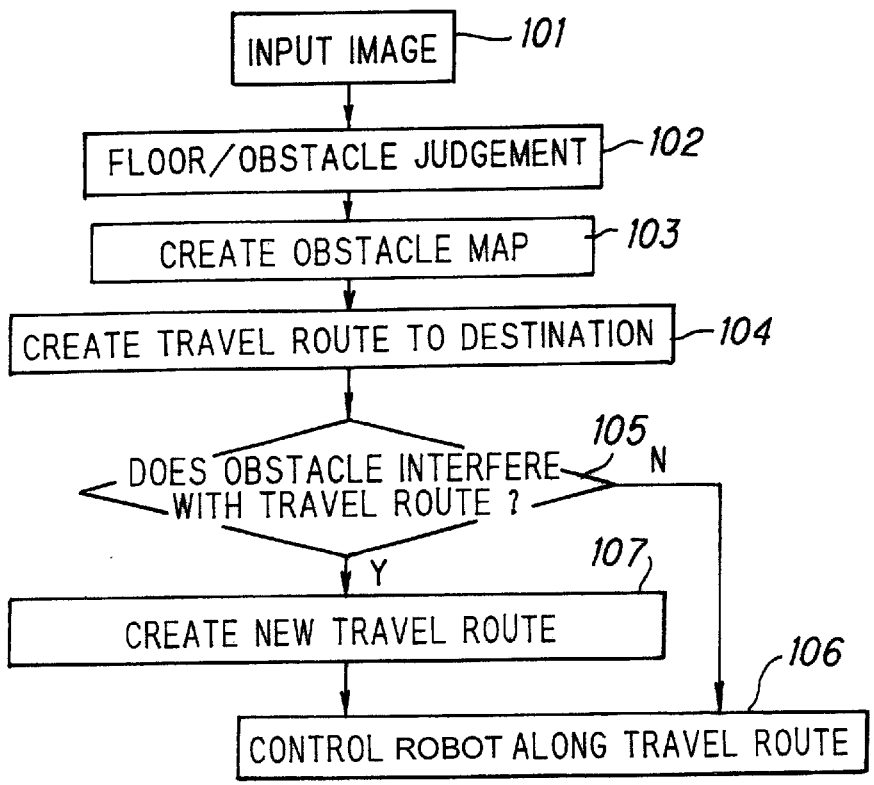
FIG. 4 is a schematic flow chart of the overall robot control.

FIG. 4 is a schematic flow chart of the overall robot control, and FIG. 5 is an explanatory view of a region.

Figure 5A:
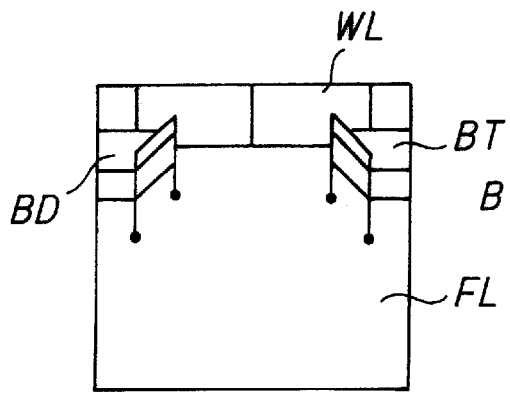
FIGS. 5A and 5B are explanatory views of a region.
Figure 5B:
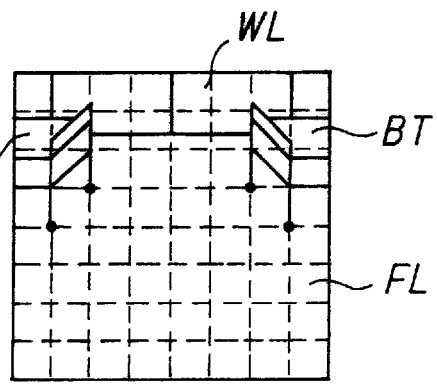

An image (see FIG. 5A) taken by a camera is divided into a plurality of regions (see FIG. 5B), and each region is judged whether it is a floor region or an obstacle region. In addition, the coordinate values of the floor and the obstacles on the image plane are measured (steps 101, 102). In FIGS. 5A and 5B, the symbol BD represents a bed, WL a wall and FL a floor. An obstacle map is then drawn (step 103). Since it is possible to measure the physical relationship between the camera coordinate system and the floor plane in advance, the obstacle map is drawn by converting the measured coordinate values of the floor and the obstacles into the positions on the floor plane.

Thereafter, the destination is inserted in the obstacle map so as to create the travel route by which the robot travels on the floor to the destination (step 104). Whether or not there is an obstacle on the travel route is then judged (step 105). For example, it is possible to judge the probability of the collision of the robot against an obstacle by judging whether or not the robot interferes with an obstacle region when the width of the travel route is enlarged to the width of the robot.

If there is no probability of the collision of the robot against an obstacle, the robot is moved along the travel route obtained (step 106). On the other hand, if there is a probability of collision, the travel route is corrected so that the robot can travel to the destination while avoiding the obstacle or a new travel route is searched for (step 107). The travel route correction or search processing is executed by adopting a potential method, a graph searching method or the like. The robot is then moved along the new travel route (step 106).

In the above, the robot to which the present invention is applicable is schematically explained. The present invention relates to the image processing apparatus for extracting a floor region and an obstacle region from an image taken by a camera. Embodiments of an image processing apparatus according to the present invention will be explained in the following.

FIG. 6 shows the structure of a first embodiment of an image processing apparatus according to the present invention. In FIG. 6, the reference numeral 11 represents an image inputting portion such as a camera, 12 an AD converter for converting the density (lightness) of each pixel of an image taken by the camera 11 into digital density data 0 to 255, 13 an image memory for storing the digital density data of each pixel, 14 a dividing and reading portion for dividing the image into a plurality of regions and outputting the pixel data (density data) of each pixel in each region from the image memory 13, and 15 an accumulator for calculating the correlation between a template image having a density g (e.g., density 0) and the image of each region and accumulating the absolute value of the difference in the density value of each pixel between both images. Since it is assumed that the densities g of all the pixels of the template image are constant (=0), only the density g is input to the accumulator 15 as the template image. The reference numeral 16 denotes a floor/obstacle judging portion which compares a set value Rs with the accumulated value R (accumulated density) for all the pixels within a target region and judges whether the target region is a floor region or an obstacle region on the basis of the result of the comparison, 17 a storage portion for storing the result of the judgement, and 18 a processor (CPU).

Since light is thrown over the floor, the density (lightness) of the floor portion in an image taken by the camera is larger than a predetermined value. If there is an obstacle, the density of the obstacle is smaller than the predetermined value due to the color or the shadow of the obstacle itself. Consequently, the floor/obstacle judging portion judges a target region to be a floor region when the accumulated value R (accumulated density) is larger than the set value Rs, while judging it to be an obstacle region when the accumulated value R is smaller than the set value Rs.

Figure 7A:
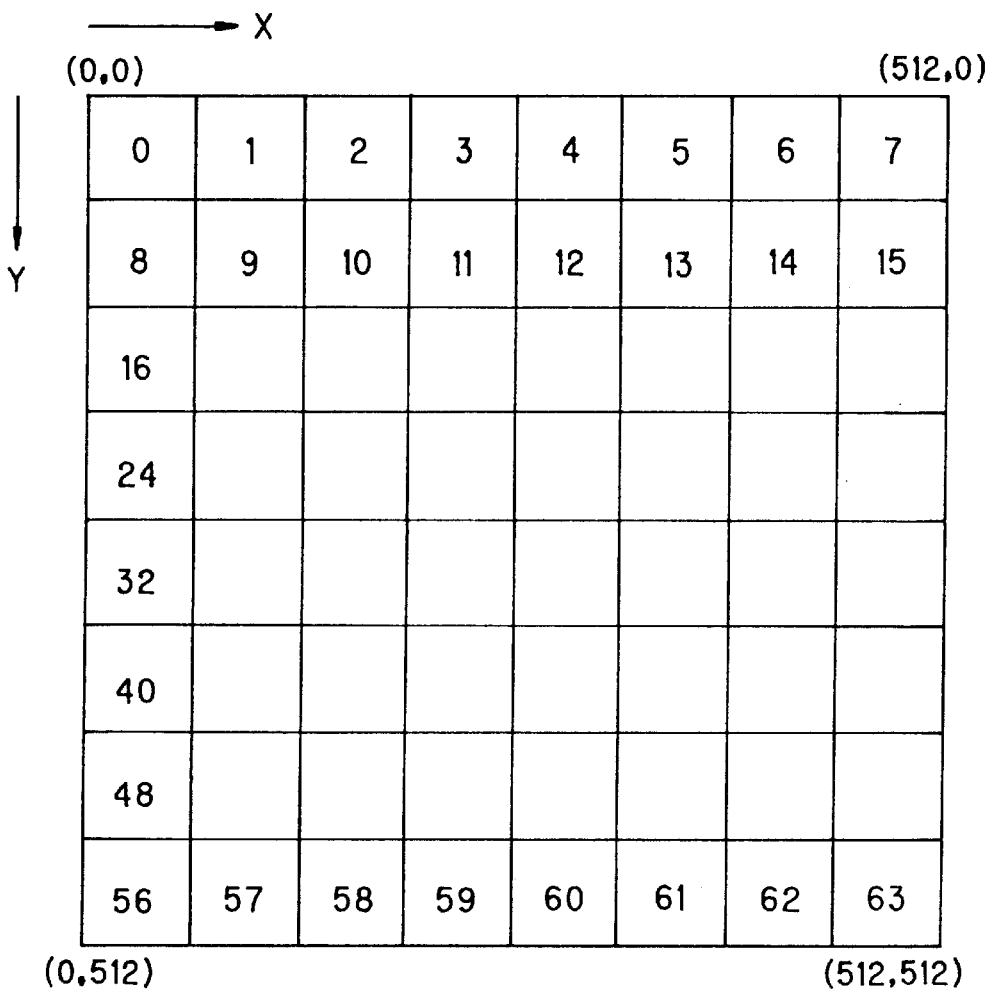
FIGS. 7A and 7B are explanatory views of an image memory.
Figure 7B:
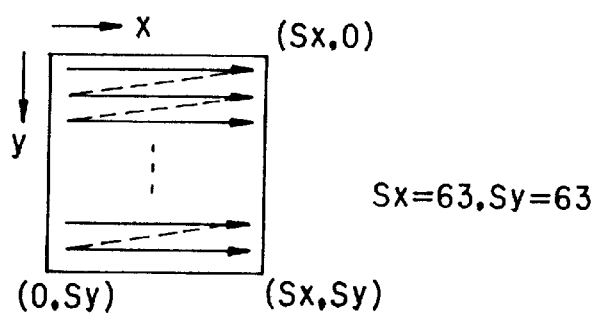

In the dividing and reading portion 14, the reference numeral 14a denotes a region address register. The image memory 13 is composed of 512×512 pixels and divided into 64 regions each of which is composed of 64×64 pixels, as shown in FIG. 7A. Region addresses A=0 to 63 are assigned to the respective regions. The addresses A of target regions are serially set by the processor 18. The reference numeral 14b represents an x-address register for outputting the x-address in a region and 14c a y-address register for outputting the y-address in a region. The addresses x, y are set in the x- and y-address registers 14b, 14c, respectively, by the processor 18. Each region has a size of Sx×Sy (=64×64), as shown in FIG. 7B, so that the x-address takes the value of 0 to Sx (=63) and the y-address takes the value of 0 to Sy (=63). In the floor/obstacle extraction process for each region, the processor 18 serially generates the x-addresses and the y-addresses by a raster scan method, as indicated by the arrows in FIG. 7B, and sets the x-addresses and the y-addresses in the registers 14b and 14c, respectively. The processor 18 also serially sets the region addresses A from 0 in the ascending order in the region address register 14a.

The reference numeral 14d represents an address generator for generating an address of a pixel (pixel address) in the image memory 13 by using a region address A and x- and y-addresses in the region.

Figure 8:
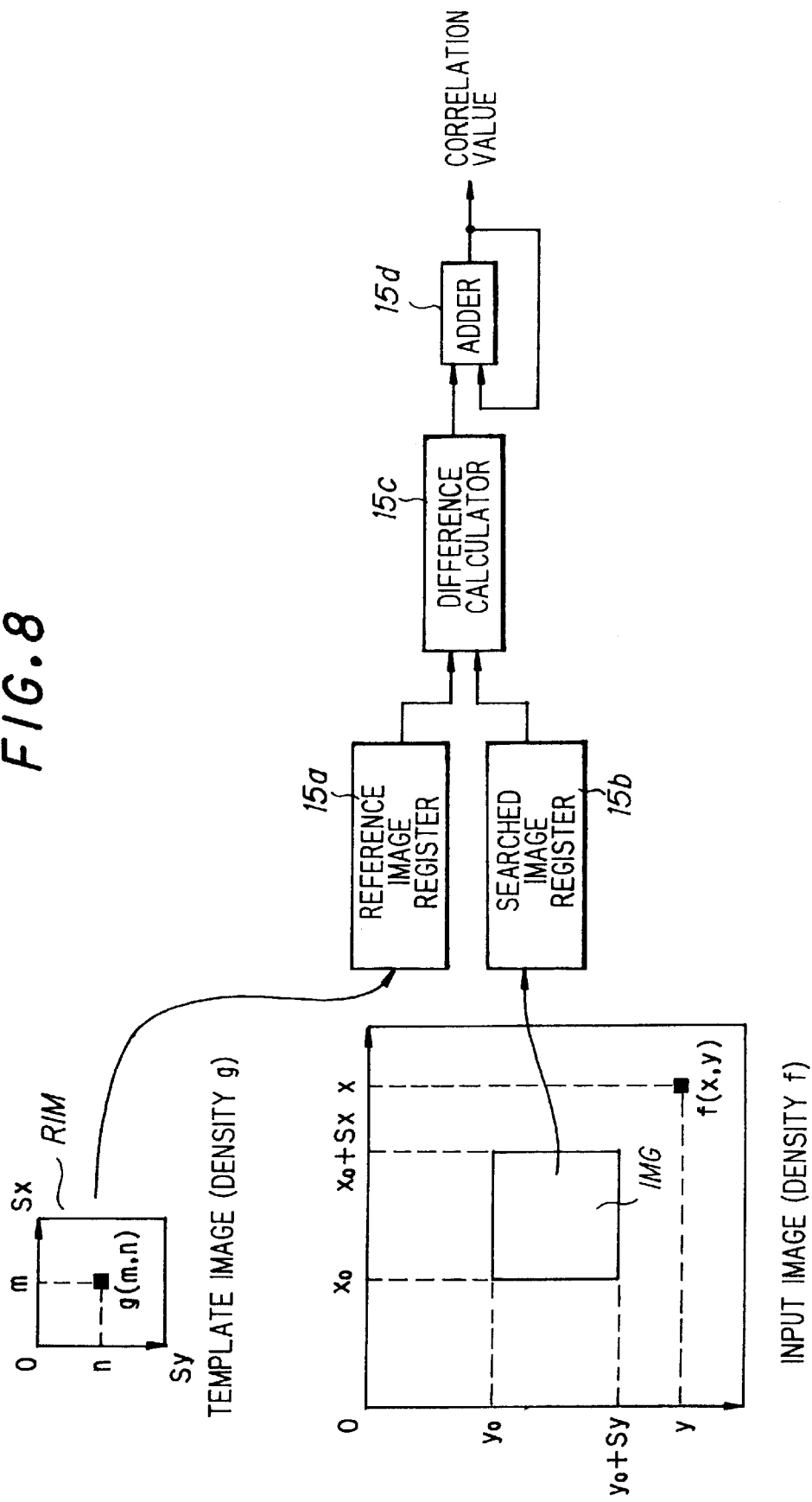
FIG. 8 is an explanatory diagram for calculation of correlation value.

FIG. 8 shows the structure of the accumulator 15 for calculating correlation. In FIG. 8, the reference numeral 15a denotes a reference image register for storing the density data of a predetermined pixel which is read out of a reference image RIM (template image), 15b a searched image register for storing the density data of a pixel which is read out of the image memory 13, 15c a difference calculator for calculating the absolute value of the difference in the density between both registers 15a, 15b and outputting the absolute value, and 15d an adder for accumulating the difference and outputting the accumulated value as a correlation value. A reference image has the same size as each region, namely, a size of Sx×Sy (=64×64). The density data of the corresponding pixels in the reference image RIM and an image IMG in a predetermined region of the image taken by the camera are serially read and input to the registers 15a and 15b, respectively, and the absolute value of the difference between the pixels is calculated by the difference calculator 15c. The result of the calculation is accumulated by the adder 15d. In this manner, the accumulated value of the differences for all of the Sx×Sy (=64×64) pixels is output from the adder 15d as a correlation value. In the first embodiment, since it is assumed that the densities g (m, n) of all the pixels in the reference image are constant, a predetermined value g (=0) is constantly set in the reference image register 15a. When g=0, the adder 15d outputs the accumulated value (accumulated density) of the densities of the pixels in a target region as a correlation value.

Figure 9:
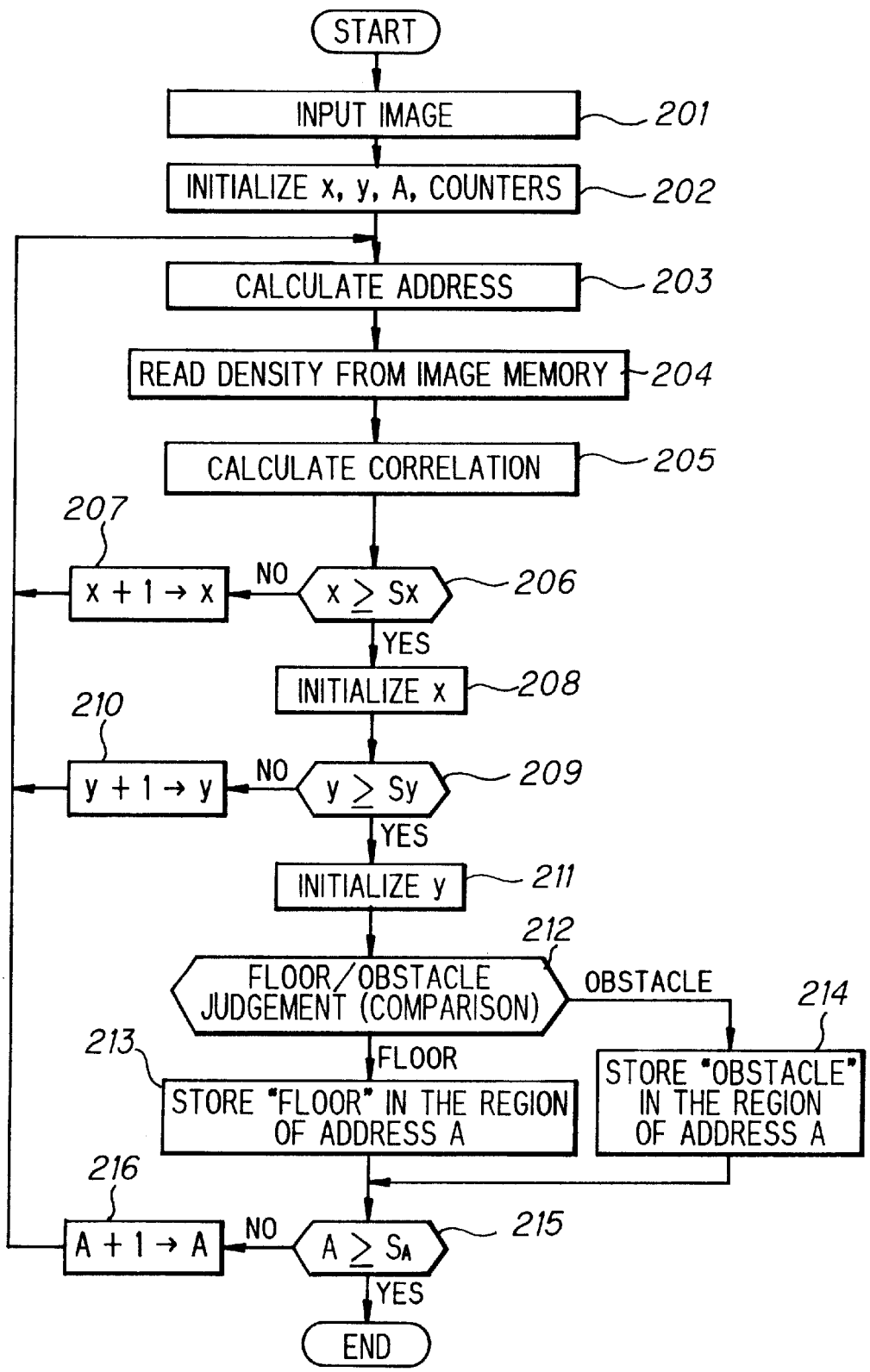
FIG. 9 is a flow chart of a floor/obstacle judgement process in the first embodiment.

FIG. 9 is a flow chart of a floor/obstacle judgement process in the first embodiment.

An analog image taken by the camera 11 is converted into a digital image and stored in the image memory 13 (step 201). The CPU 18 initializes the data (returns the data to 0) in the region address register 14a, the x-address register 14b and the y-address register 14c (step 202). The address generator 14d calculates the address of a pixel in the image memory 13 by using the addresses A, x and y in the respective registers 14a to 14c (step 203), and the density of the pixel read from the address is input to the accumulator 15 (step 204). The accumulator calculates the absolute value of the difference between the input density and the set density g (=0) and accumulates the absolute value (step 205). The processor 18 judges whether or not $x \geq Sx$ (step 206). If x<Sx, 1 is added to x (x+1→x) (step 207), and the process is repeated from the step 203 and onward.

When x becomes equal to Sx after the repetition of the process, x is initialized (step 208), and judgement is made as to whether or not $y \geq Sy$ (step 209). If y<Sy, 1 is added to y (y+1→y) (step 210), and the process is repeated from the step 203 and onward.

When y becomes equal to Sy, y is initialized (step 211), and the correlation calculation for the region of address A=0 is finished.

The floor/obstacle judging portion 16 then compares the correlation value R (accumulated density) with the set value Rs (step 212), and if R>Rs, the floor/obstacle judging portion 16 judges the target region to be a floor region and stores "11" (=floor) in the storage area of the storage portion 17 designated by the region address A (step 213). On the other hand, if R ≦Rs, the floor/obstacle judging portion 16 judges the target region to be an obstacle region and stores "0" (=obstacle) in the storage area of the storage portion 17 designated by the region address A (step 214).

Thereafter, judgement is made as to whether or not A≧$S_A$ (=63) (step 215). If A<$S_A$, 1 is added to A (A+1 →A) (step 216), and the process is repeated from the step 203 and onward.

When A=$S_A$, the floor/obstacle judgement process for all the regions is finished. That is, the extraction of the floor and obstacles from the image taken by the camera is finished.

In the above-described embodiment, the accumulated value (accumulated density) of the densities of all the pixels in a region is compared with the set value in order to determine whether the target region is a floor region or an obstacle region. Alternatively, it is possible to judge whether the target region is a floor region or an obstacle region by comparing a set value with the average density obtained by dividing the accumulated density by the number of pixels.

In the second embodiment, the average density of each region is calculated, and the absolute value of the difference between the density of each pixel of each region and the average density of a target region is calculated and accumulated. Whether the target region is a floor region or an obstacle region is judged on the basis of the result of comparison between a set value and the accumulated value of the absolute values for all the pixels within the target region.

There is a small change in the density in a floor region, while the change in the density is large in an obstacle region due to its shadow or the like. The second embodiment is based on this point. The average density of each region is obtained, and deviation from the average density of a target region is obtained by accumulating absolute value of the difference between the density of each pixel of the target region and the average density. If the deviation is small, the region is judged to be a floor region, while if the deviation is large, the region is judged to be an obstacle region.

Figure 10:
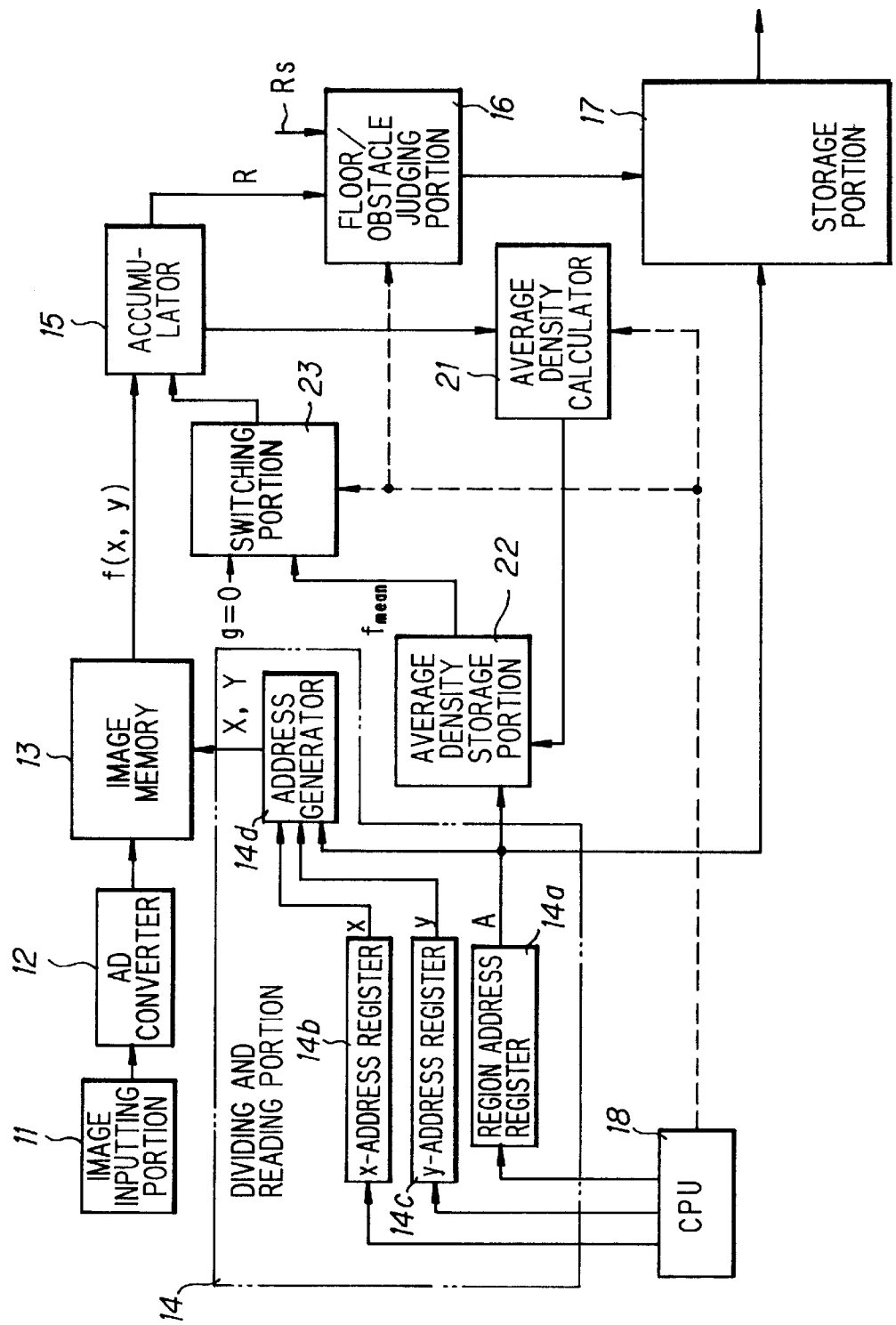
FIG. 10 shows a second embodiment of an image processing apparatus according to the present invention.

FIG. 10 shows the structure of a second embodiment of an image processing apparatus according to the present invention. The same reference numerals are provided for the elements which are the same as those in the first embodiment shown in FIG. 6.

In FIG. 10, the reference numeral 11 represents an image inputting portion such as a camera, 12 an AD converter for converting the density (lightness) of each pixel of an image taken by the camera 11 into digital density data, 13 an image memory for storing the digital density data of each pixel, 14 a dividing and reading portion for dividing the image into a plurality of regions and outputting the pixel data (density data) of each pixel in each region from the image memory 13, and 15 an accumulator for calculating the correlation between a template image and the image of each region and accumulating the absolute value of the difference in the density value of each pixel between both images. When the average density of each region is calculated, it is assumed that the densities g of all the pixels of the template image are constant (=0), and when judgment is made as to whether a target region is a floor region or an obstacle region, it is assumed that the densities g of all the pixels in the template image are an average density $f_{mean}$. Consequently, only the density g (=0) or the average density $f_{mean}$ is selectively input to the accumulator 15 as the template image.

The reference numeral 16 denotes a floor/obstacle judging portion which compares a set value Rs with the accumulated value R (accumulated difference) of the absolute value of the difference between the density of each pixel in the target region and the average density and judges whether a target region is a floor region or an obstacle region on the basis of the result of the comparison, 17 a storage portion for storing the result of the judgement, and 18 a processor (CPU). The reference numeral 21 represents an average density calculator for calculating the average density of each region by dividing the accumulated value of the densities of all the pixels in each region by the number of pixels in the corresponding region, 22 an average density storage portion for storing the average density $f_{mean}$ of each region, and 23 a switching portion for selecting and outputting the density g (=0) or the average density $f_{mean}$.

In the dividing and reading portion 14, the reference numeral 14a denotes a region address register, 14b an x-address register for outputting the x-address in a region, 14c a y-address register for outputting the y-address in a region, and 14d an address generator for generating an address of a pixel (pixel address) in the image memory 13 by using a region address A and x- and y-addresses in the region.

Figure 11:
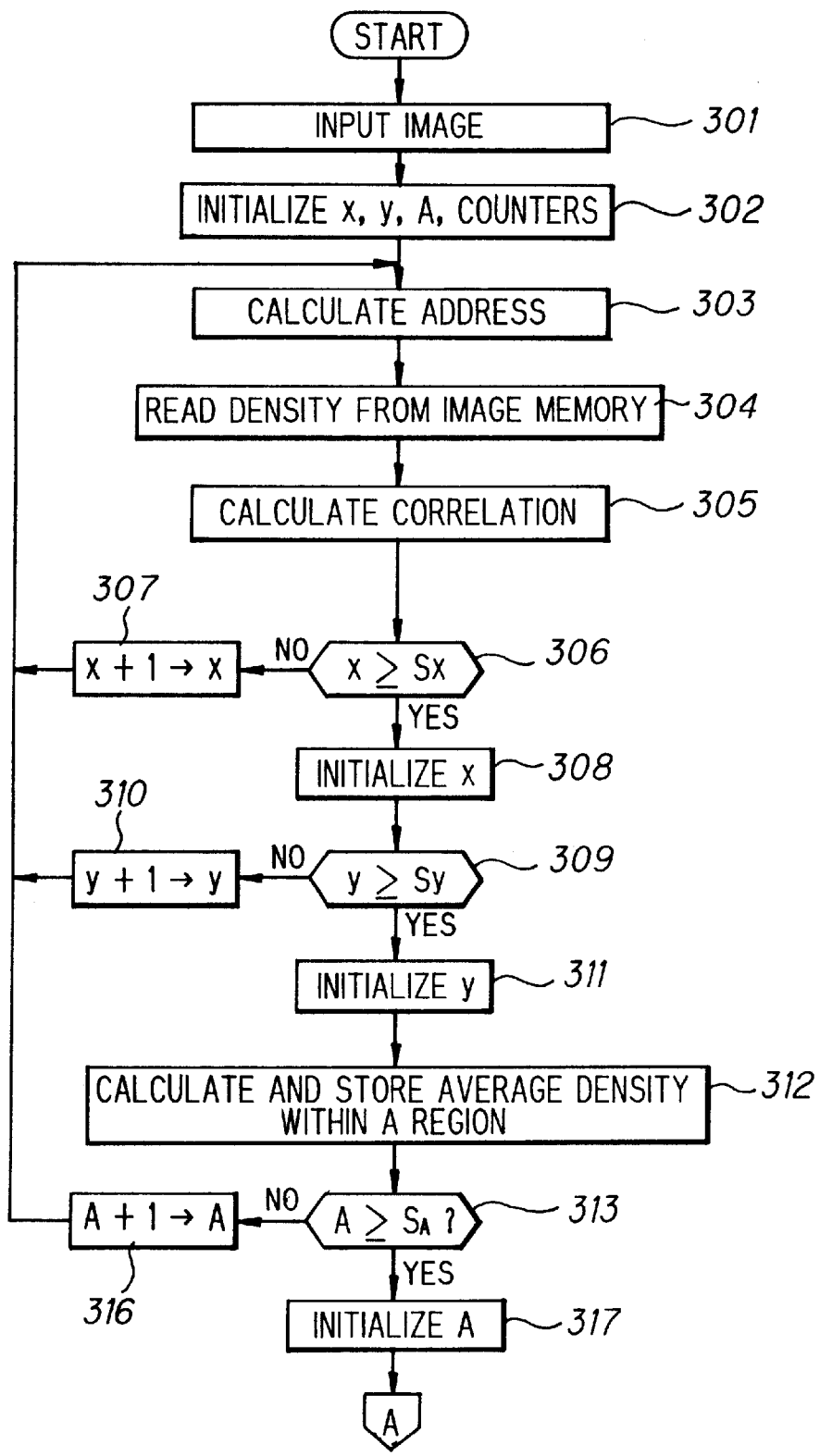
FIGS. 11 and 12 are a flow chart of a floor/obstacle judgement process in the second embodiment.
Figure 12:
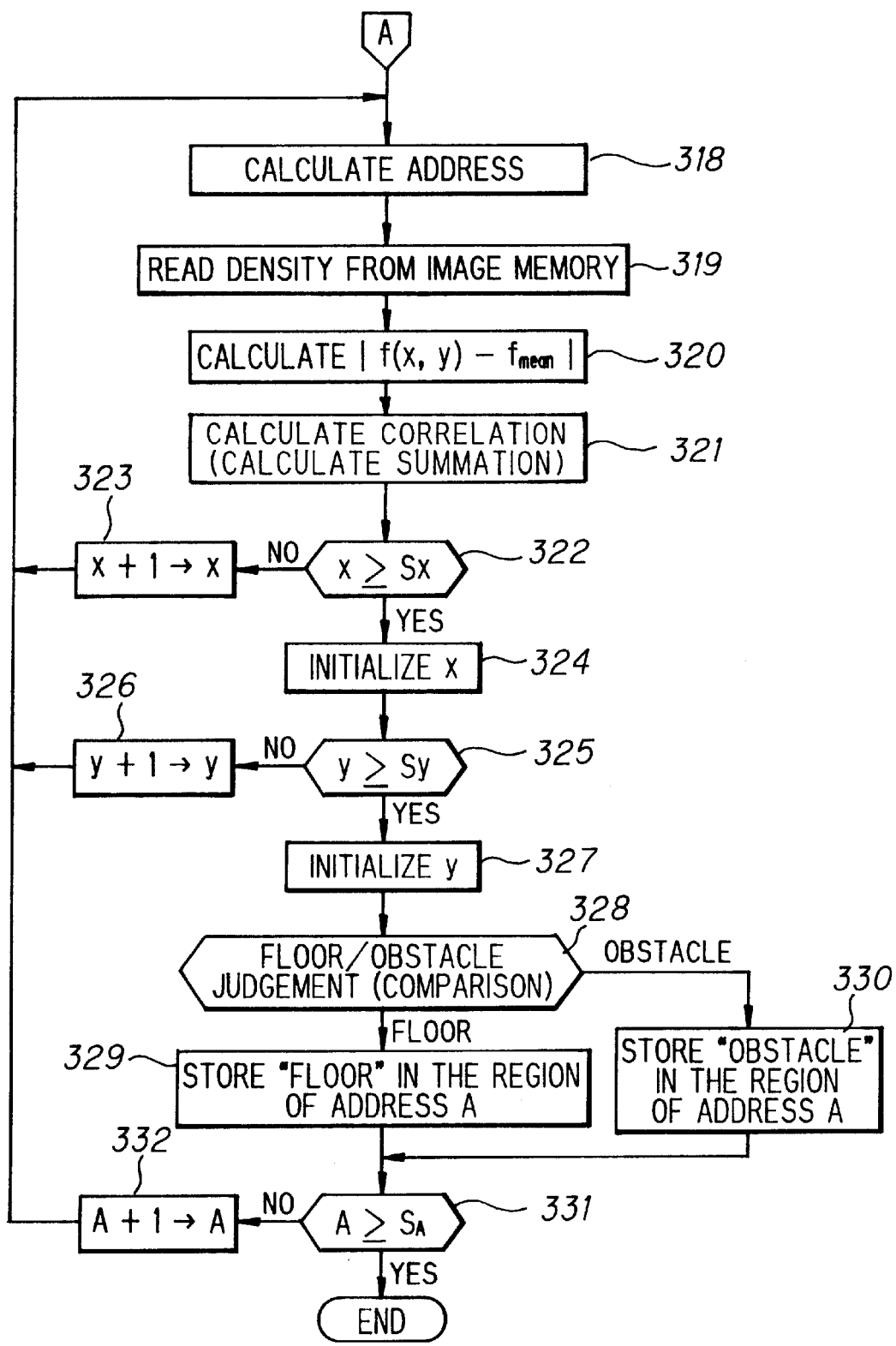

FIGS. 11 and 12 are a flow chart of a floor/obstacle judgement process in the second embodiment.

An analog image taken by the camera 11 is converted into a digital image and stored in the image memory 13 (step 301). The CPU 18 initializes the data (returns the data to 0) in the region address register 14a, the x-address register 14b and the y-address register 14c (step 302). The address generator 14d calculates the address of a pixel in the image memory 13 by using the addresses A, x and y in the respective registers 14a to 14c (step 303), and the density of the pixel read from the address is input to the accumulator 15, and the switching portion 23 inputs the set density g (=0) to the accumulator 15 under the control of the processor 18 (step 304).

The accumulator 15 calculates the absolute value of the difference between the input density and the set density g (=0) and accumulates the absolute value (step 305). The processor 18 judges whether or not x≧Sx (step 306). If x<Sx, 1 is added to x (x+1→x) (step 307), and the process is repeated from the step 303 and onward.

When x becomes equal to Sx after the repetition of the process, x is initialized (step 308), and judgement is made as to whether or not y>Sy (step 309). If y<Sy, 1 is added to y (y+1→y) (step 310), and the process is repeated from the step 303 and onward.

When y becomes equal to Sy after the repetition of the process, y is initialized (step 311), and the correlation calculation for the image in the region of the address A=0 and the template image having a density g=0 is finished.

Thereafter, the average density calculator 21 calculates the average density of the region by dividing the correlation value (accumulated density) by the number of pixels Sx×Sy (=64×64) and stores the average density in the storage area of the average density storage portion 22 designated by the region address A (step 312). Judgement is made as to whether or not $A>S_A$ (=63) (step 313). If $A<S_A$, 1 is added to A (A+1→A) (step 316), and the process is repeated from the step 303 and onward. When $A=S_A$, it means the calculation of the average densities of all the regions is finished and that the average densities obtained are stored in the average density storage portion 22.

Thereafter, the region address A is initialized (step 317). The address generator $14_d$ calculates the address of a pixel in the image memory 13 by using the addresses A, x and y in the respective registers 14a to 14c (step 318), and the density of the pixel read from the address is input to the accumulator 15. The switching portion 23 reads the average density $f_{mean}$ of the region of the address A from the storage portion 22 and inputs it to the accumulator 15 under the control of the processor 18 (step 319).

The accumulator 15 calculates the absolute value of the difference between the input density and the average density $f_{mean}$ and accumulates the absolute value (steps 320, 321). The processor 18 judges whether or not $x \geq Sx$ (step 322). If $x<Sx$, 1 is added to x (x+1→x) (step 323), and the process is repeated from the step 318 and onward.

When x becomes equal to Sx after the repetition of the process, x is initialized (step 324), and judgement is made as to whether or not $y \geq Sy$ (step 325). If $y<Sy$, 1 is added to y (y+1→y) (step 326), and the process is repeated from the step 318 and onward.

When y becomes equal to Sy after the repetition of the process, y is initialized (step 327), and the correlation calculation for the image in the region of the address A=0 and the template image having a density g of the average density $f_{mean}$ is finished.

The floor/obstacle judging portion 16 then compares the correlation value R (accumulated difference) with the set value Rs (step 328), and if R<Rs, the floor/obstacle judging portion 16 judges the target region to be a floor region and stores "1" (=floor) in the storage area of the storage portion 17 designated by the region address A (step 329). On the other hand, if $R \geq Rs$, the floor/obstacle judging portion 16 judges the target region to be an obstacle region and stores "0" (=obstacle) in the storage area of the storage portion 17 designated by the region address A (step 330).

Thereafter, judgement is made as to whether or not $A \geq S_A$ (=63) (step 331). If $A<S_A$, 1 is added to A (A+1→A) (step 332), and the process is repeated from the step 318 and onward.

When $A=S_A$, it means the floor/obstacle judgement process for all the regions is finished. That is, the extraction of the floor and obstacles from the image taken by the camera is finished.

In the above-described embodiment, the accumulated value of the differences in the density of all the pixels in a target region is compared with the set value in order to determine whether the target region is a floor region or an obstacle region. Alternatively, it is possible to judge whether the target region is a floor region or an obstacle region by comparing a set value with the average difference obtained by dividing the accumulated difference R by the number of pixels.

Figure 13:
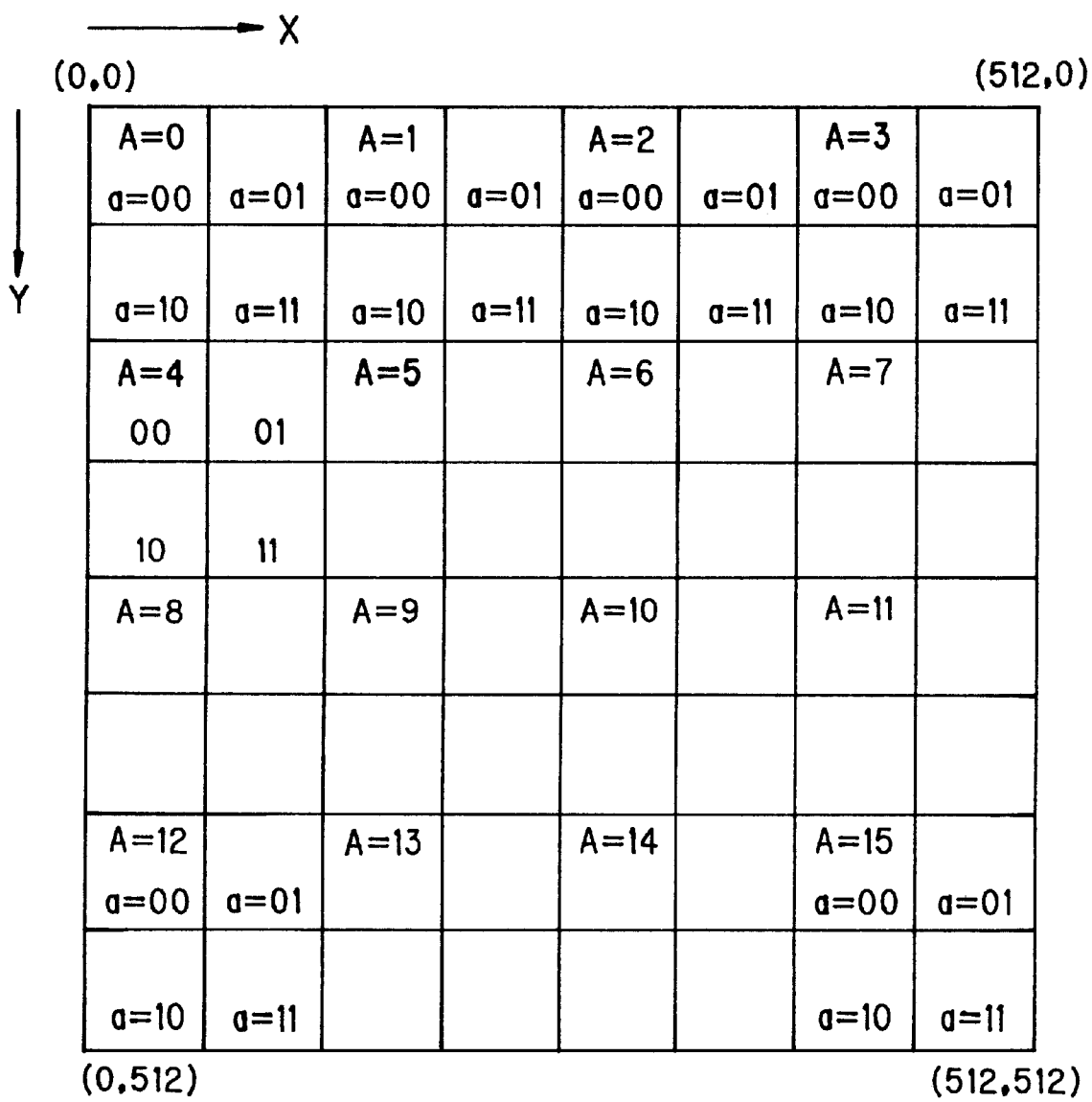
FIG. 13 is an explanatory view of divided region of an image memory.
Figure 14:
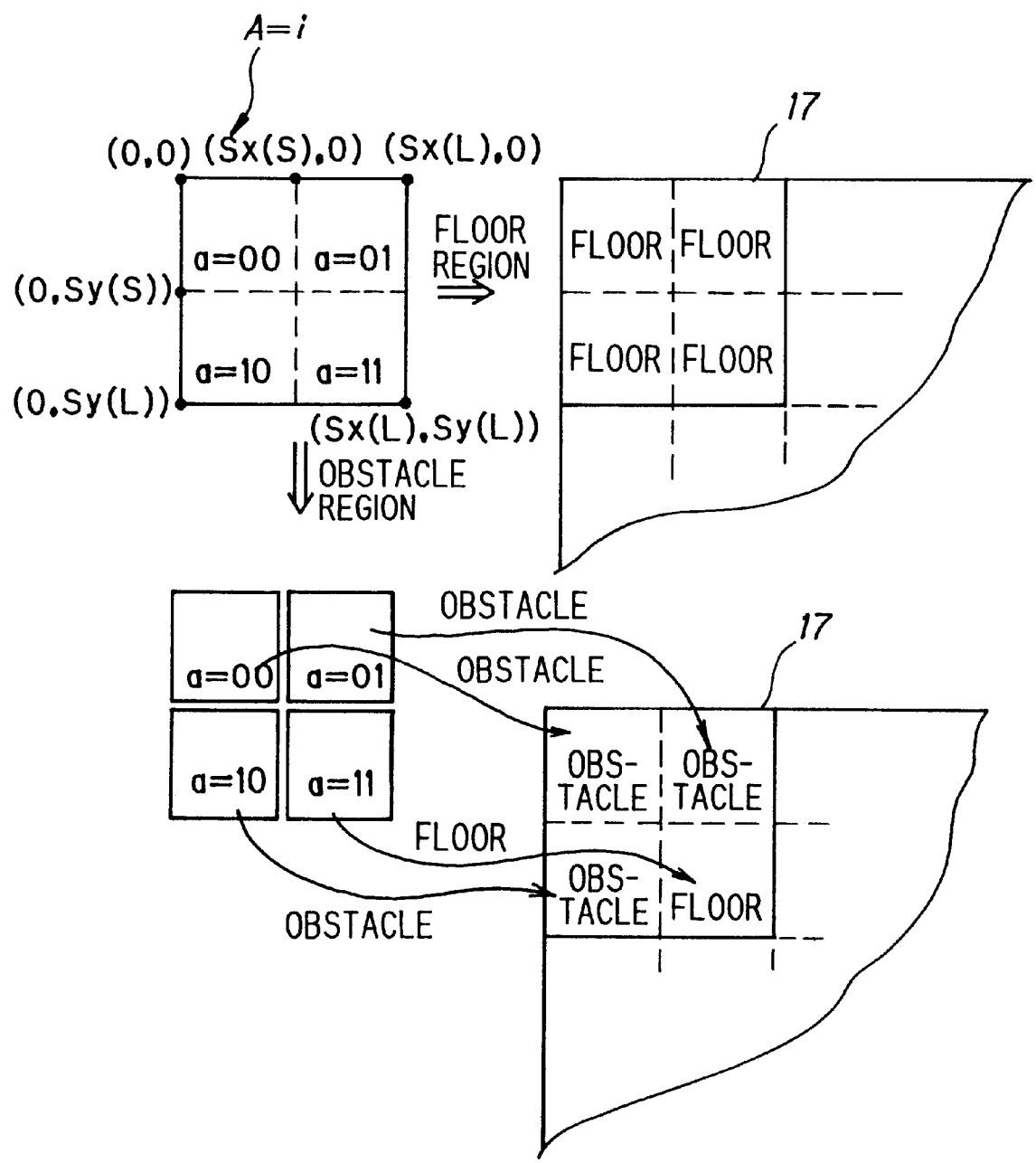
FIG. 14 is an explanatory view of a third embodiment of the present invention.

In the first and second embodiment, an image is divided into regions having a predetermined size, and judgement is made as to whether a region is a floor region or an obstacle region for each region. In the third embodiment, an image (image memory) is divided into a plurality of regions A=0 to 15, as shown in FIG. 13, and each region is further divided into a plurality of subregions a=00 to 11 each having the same size as the region in the first and second embodiments. As shown in FIG. 14 judgement is made as to whether a target region A =i is a floor region or an obstacle region, and if the target region is judged to be a floor region, all the subregions a=00 to 11 that constitute the target region are judged to be floor regions and the results of the judgement are stored in the storage portion 17. On the other hand, when the target region is judged to be an obstacle region, the floor/obstacle region judgement process is executed for each of the subregion a=00 to 11 which constitute the target region and the results of the judgement are stored in the storage portion 17.

(d-2) Structure

Figure 15:
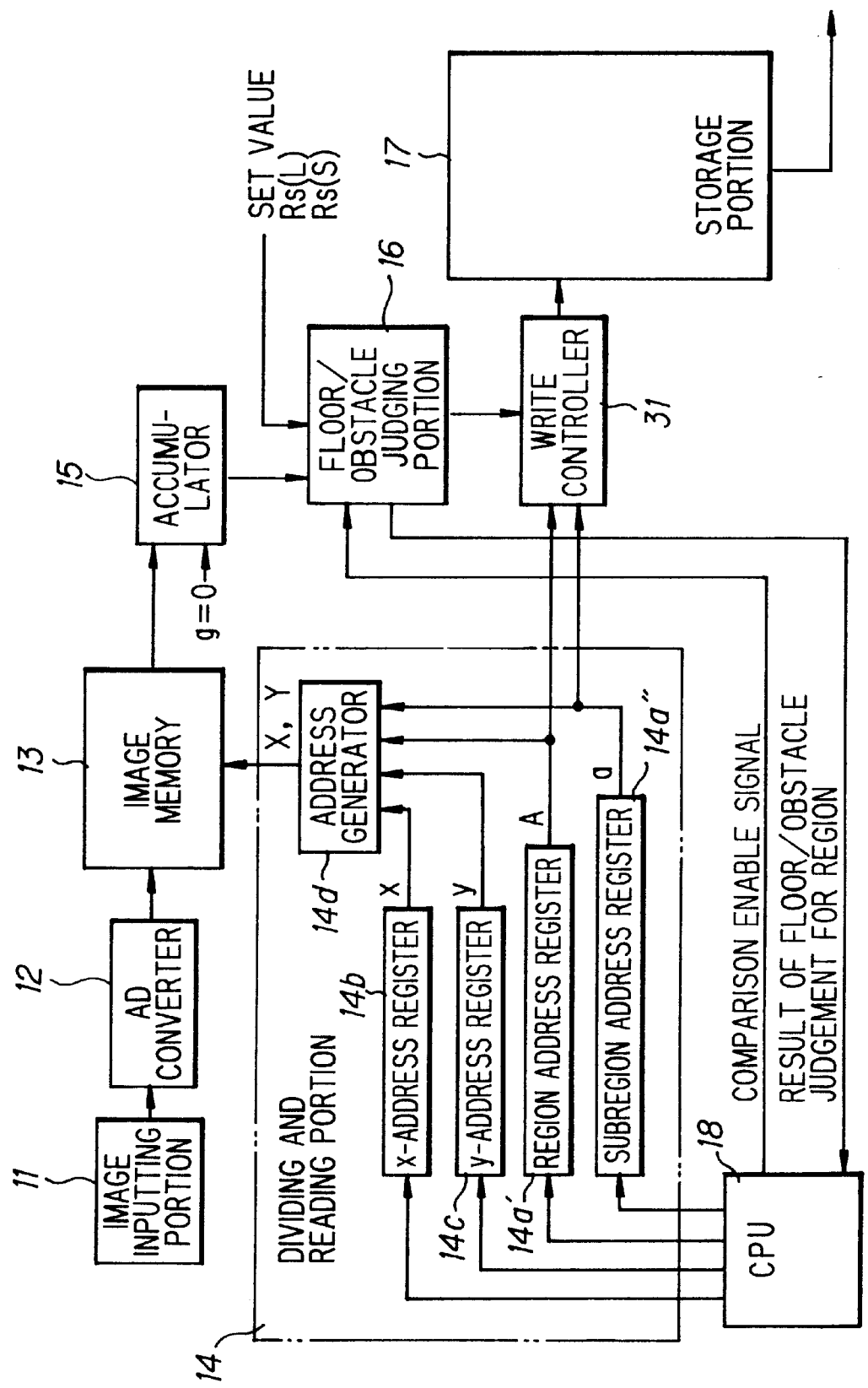
FIG. 15 shows a third embodiment of an image processing apparatus according to the present invention.

FIG. 15 shows the structure of a third embodiment of an image processing apparatus according to the present invention. The same reference numerals are provided for the elements which are the same as those in the first embodiment shown in FIG. 6. This structure is different from that of the first embodiment in that a region register 14a' and a subregion register 14a" are provided in place of the region register 14a, and in that a write controller 31 is provided.

The write controller 31 stores "1"(=floor) in the storage areas of the storage portion 17 which correspond to the subregions a=00 to 11 constituting a target region when the target region is judged to be a floor region. When a subregion a=00 to 11 is judged to be a floor region or an obstacle region, the write controller 31 stores "1" (=floor) or "0"(= obstacle) in the corresponding storage area of the storage portion 17.

Figure 16:
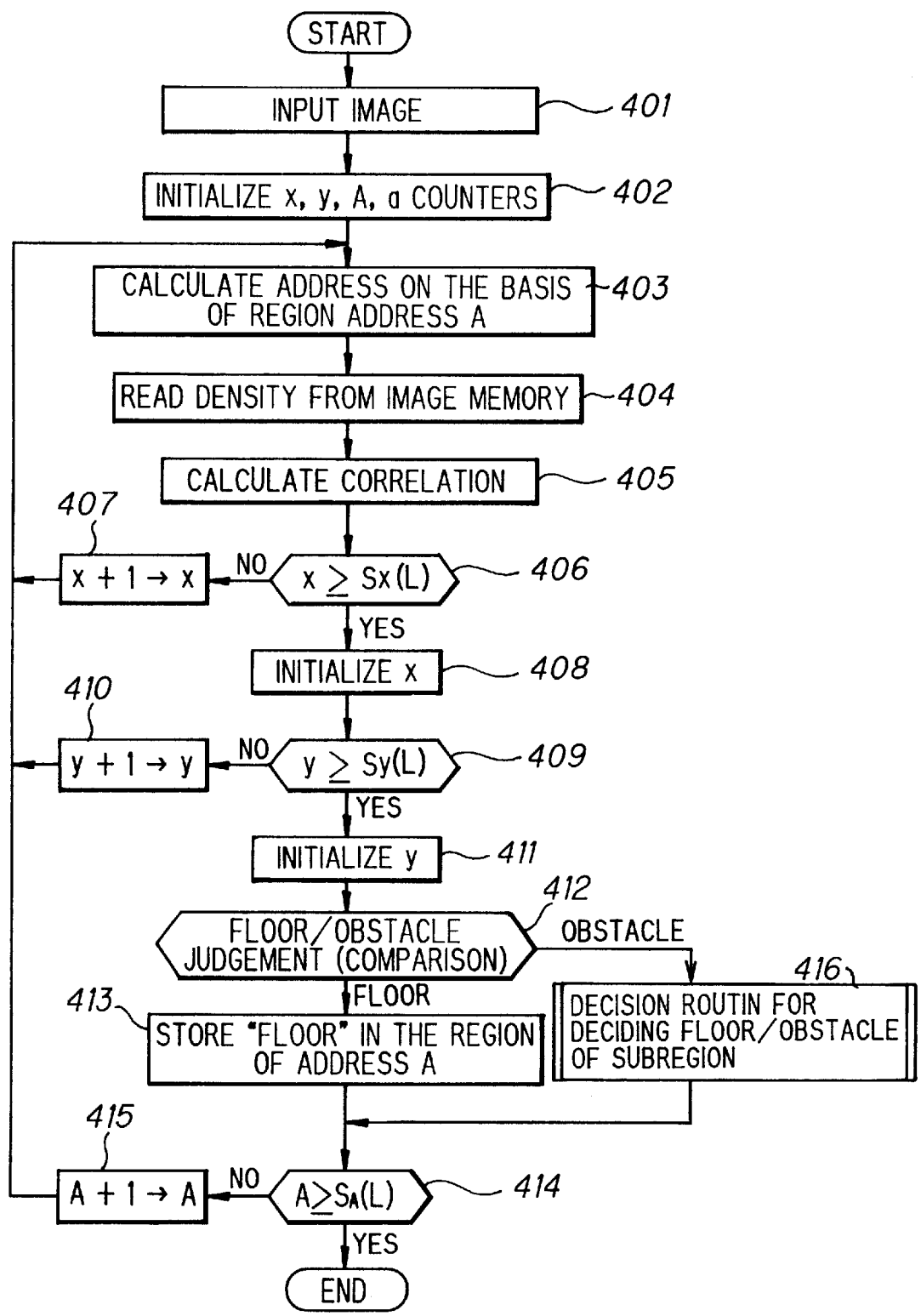
FIG. 16 is a flow chart of a floor/obstacle judgement process in the third embodiment.

FIG. 16 is a flow chart of a floor/obstacle judgement process in the third embodiment.

An analog image taken by the camera 11 is converted into a digital image and stored in the image memory 13 (step 401). The CPU 18 initializes the data (returns the data to 0) in the region address register 14a', the subregion address register 14a", the x-address register 14b and the y-address register 14c (step 402). The address generator 14d calculates the address of a pixel in the image memory 13 by using the addresses A, x and y in the respective registers 14a' to 14c (step 403), and the density of the pixel read from the address is input to the accumulator 15 (step 404). The accumulator 15 calculates the absolute value of the difference between the input density and the set density g (=0) and accumulates the absolute value (step 405). The processor 18 judges whether or not $x \geq Sx(L)$ (step 406). If $x<Sx(L)$, 1 is added to x (x+1→x) (step 407), and the process is repeated from the step 403 and onward. The symbol Sx(L) represents the size of a region in the direction of x.

When x becomes equal to Sx(L) after the repetition of the process, x is initialized (step 408), and judgement is made as to whether or not $y \geq Sy(L)$ (step 409). If $y<Sy(L)$, 1 is added to y (y+1→y) (step 410), and the process is repeated from the step 403 and onward. The symbol Sy(L) represents the size of a region in the direction of y.

When y becomes equal to Sy(L), y is initialized (step 411), and the correlation calculation for the region of the address A=0 is finished.

The floor/obstacle judging portion 16 then compares the correlation value R (accumulated density) with the set value Rs(L) (step 412), and if $R \geq Rs(L)$, the floor/obstacle judging portion 16 judges the target region to be a floor region. The write controller 31 stores "1"(=floor) in the storage areas of the storage portion 17 which correspond to the subregions a=00 to 11 constituting the target region (step 413).

Thereafter, judgement is made as to whether or not $A \geq S_A(L)$ (=15) (step 414). If $A<S_{A(L)}$, 1 is added to A (A+1→A) (step 415), and the process is repeated from the step 403 and onward. The symbol $S_A(L)$ represents the total number of regions.

When $A=S_A(L)$, it means the floor/obstacle judgement process for all the regions is finished. That is, the extraction of the floor and obstacles from the image taken by the camera is finished.

If $R \geq Rs(L)$ at the step 412, the floor/obstacle judgement process is executed for each of the subregions a=00 to 11 which constitute the target region (step 416). Thereafter, the process is repeated from the step 414 and onward.

Figure 17:
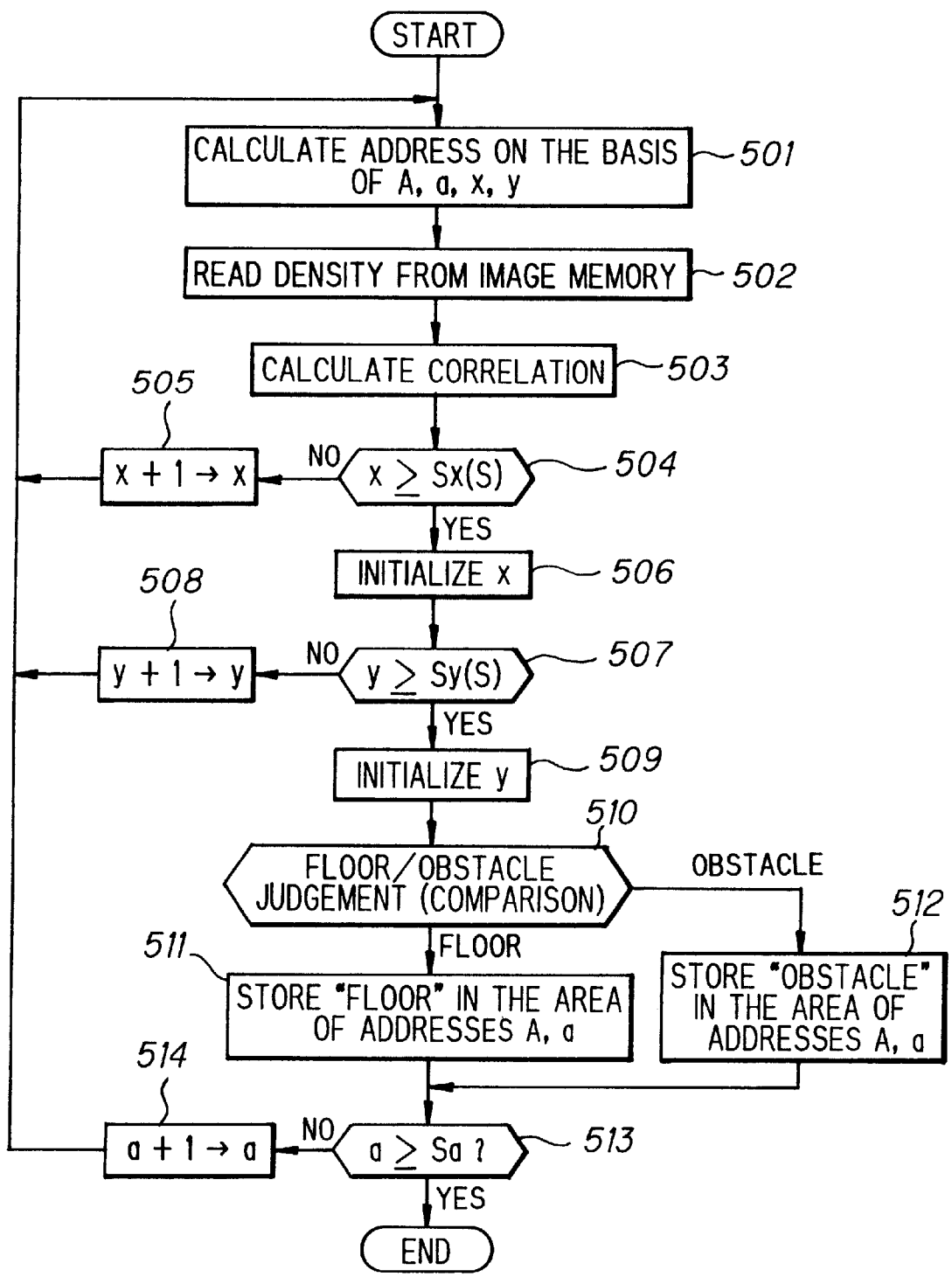
FIG. 17 shows a floor/obstacle judgement routine for a subregion.

FIG. 17 is a flow chart of a floor/obstacle judgement routine for a subregion.

The address generator 14d calculates the address of a pixel in the image memory 13 by using the addresses A, a, x and y in the respective registers 14a' to 14c (step 501), and the density of the pixel read from the address is input to the accumulator 15 (step 502). The accumulator 15 calculates the absolute value of the difference between the input density and the set density (=0) and accumulates the absolute value (step 503). The processor 18 judges whether or not $x \geq Sx(S)$ (step 504). If $x<Sx(S)$, 1 is added to x (x+1→x) (step 505), and the process is repeated from the step 501 and onward. The symbol Sx(S) represents the size of a subregion in the direction of x.

When x becomes equal to Sx(S) after the repetition of the process, x is initialized (step 505), and judgement is made as to whether or not $y \geq Sy(S)$ (step 507). If $y<Sy(S)$, 1 is added to y (y+1→y) (step 508), and the process is repeated from the step 501 and onward. The symbol Sy(S) represents the size of a subregion in the direction of y.

When y becomes equal to Sy(S), y is initialized (step 509), and the correlation calculation for the subregion of the address a=00 is finished.

The floor/obstacle judging portion 16 then compares the correlation value R (accumulated density) with the set value Rs(S) (step 510), and if $R \geq Rs(S)$, the floor/obstacle judging portion 16 judges the target region to be a floor region. The write controller 31 stores "1" (=floor) in the storage area of the storage portion 17 designated by the region addresses A, a (step 511). On the other hand, if $R<Rs(S)$, the floor/obstacle judging portion 16 judges the target region to be an obstacle region and the write controller 31 stores "0" (=obstacle) in the storage area of the storage portion 17 designated by the region addresses A, a (step 512).

Thereafter, judgement is made as to whether or not $a \geq Sa$ (=11:binary number) (step 513). If $a<Sa$, 1 is added to a (a+1→a) (step 514), and the process is repeated from the step 501 and onward.

When a=Sa, the floor/obstacle judgement process for all the subregions is finished, and the process is thereafter repeated from the step 414 and onward.

In this manner, it is possible to extract a floor region and an obstacle region at a higher speed in proportion to the areal ratio of a floor region in an image.

In the above-described embodiment, a region is further divided into subregions and the accumulated density for all the pixels in a target region is compared with the set value in order to determine whether the target region is a floor region or an obstacle region. This method of dividing a region into subregions may also be adopted to a floor/obstacle judgement process for judging whether a target region is a floor or an obstacle on the basis of the result of comparison between a set value and the accumulated value of the absolute value of the difference between the density of each pixel of the target region and the average density of the target region.

It is possible not to calculate correlation for all the pixels in a region but to thin the pixels in a region for correlation calculation. For this purpose, s (integer not less than 2) is added to x in place of 1 at the step 407 (x+s→x), and s is added to y in place of 1 at the step 410 (y+→y). In this manner, it is possible to calculate correlation for every s pixels. According to this method, since the amount of computation is reduced, it is possible to extract a floor region/obstacle region at a higher speed.

In this method, the number of pixels at the time of correlation calculation is reduced by constituting the address generator so as to generate addresses for a smaller number of pixels. Alternatively, it is possible to generate and store a small-scale image and calculate correlation by using the part of the small-scale image which corresponds to a target region, thereby substantially reducing the number of pixels for calculation. According to this method, after the image is smoothed, the scale thereof is reduced unlike simple reduction in the number of pixels. It is therefore possible to scale down the image with information on an edge or the like being kept as it is, thereby enabling highly reliable processing without losing information.

In the first embodiment, the absolute value of the difference in the density value between each pixel in a target region and the set density is calculated and accumulated. A set value is compared with the accumulated value for all the pixels in the target region, and whether the target region is a floor region or an obstacle region is determined on the basis of the result of the comparison. In other words, after the accumulated value of the densities of all the pixels is calculated, floor/obstacle judgement is made by comparison. However, it is often the case that the accumulated value exceeds the set value before the end of the calculation of the accumulated value for all the pixels. In such a case, if the target region is judged to be a floor region and the correlation calculation is finished so as to begin the correlation calculation for the next region, the computation speed is enhanced. In the fourth embodiment, every time the accumulated value is obtained, it is compared with the set value, and when the accumulated value exceeds the set value, the target region is judged to be a floor region. On the other hand, when the accumulated value for all the pixels is smaller than the set value, the target region is judged to be an obstacle region.

Figure 18:
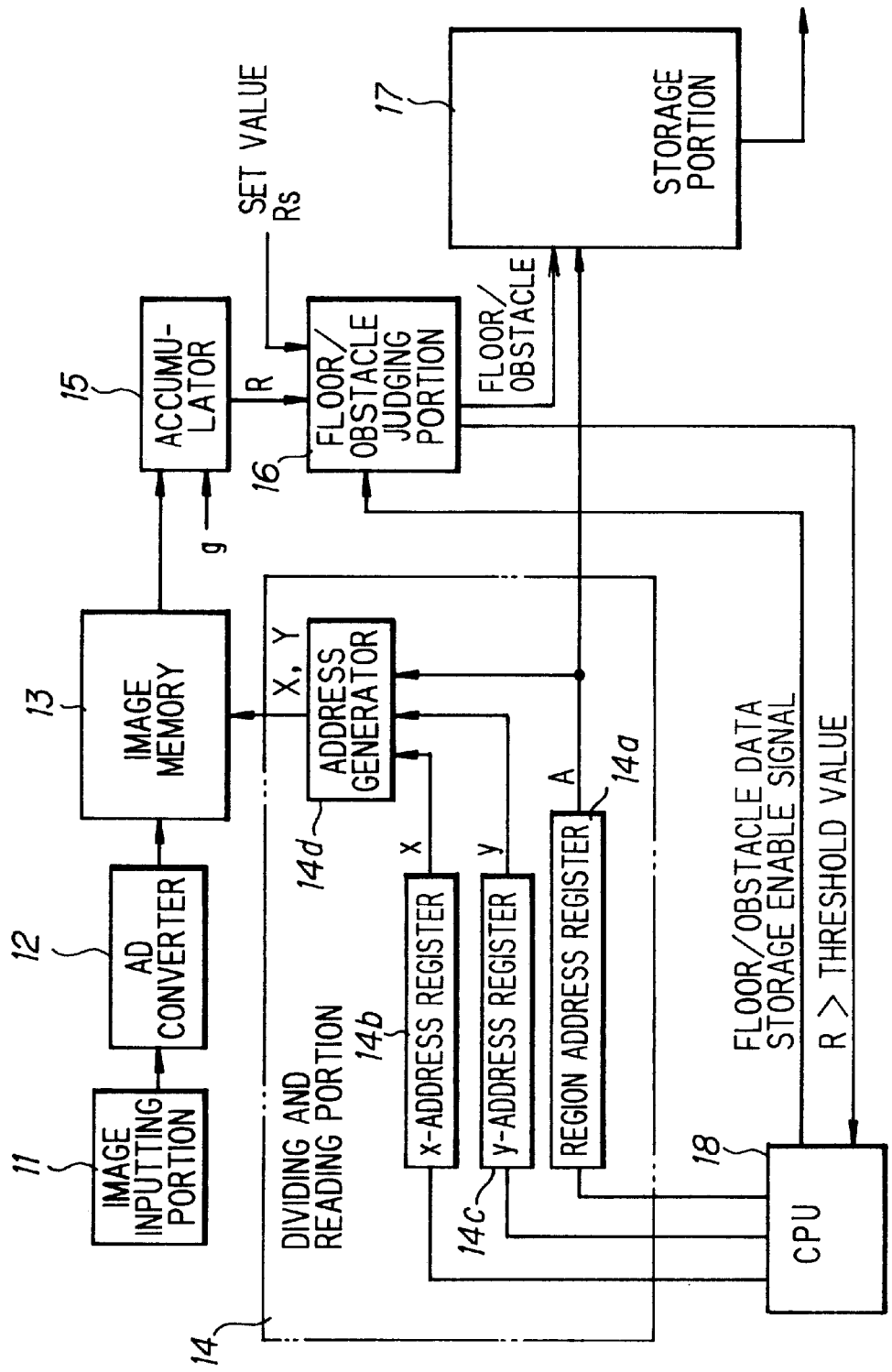
FIG. 18 shows a fourth embodiment of an image processing apparatus according to the present invention.

FIG. 18 shows the structure of a fourth embodiment of an image processing apparatus according to the present invention. The same reference numerals are provided for the elements which are the same as those in the first embodiment shown in FIG. 6. This structure is different from that of the first embodiment in that (1) the floor/obstacle judging portion 16 compares the accumulated value with the set value Rs every time the accumulated value is obtained, (2) when R becomes larger than Rs, the floor/obstacle judging portion 16 immediately informs the processor 18 that the accumulated value exceeds the threshold value Rs, and (3) when the processor 18 is informed of the fact, the processor 18 inputs a data storage enable signal to the floor/obstacle judging portion 16.

Figure 19:
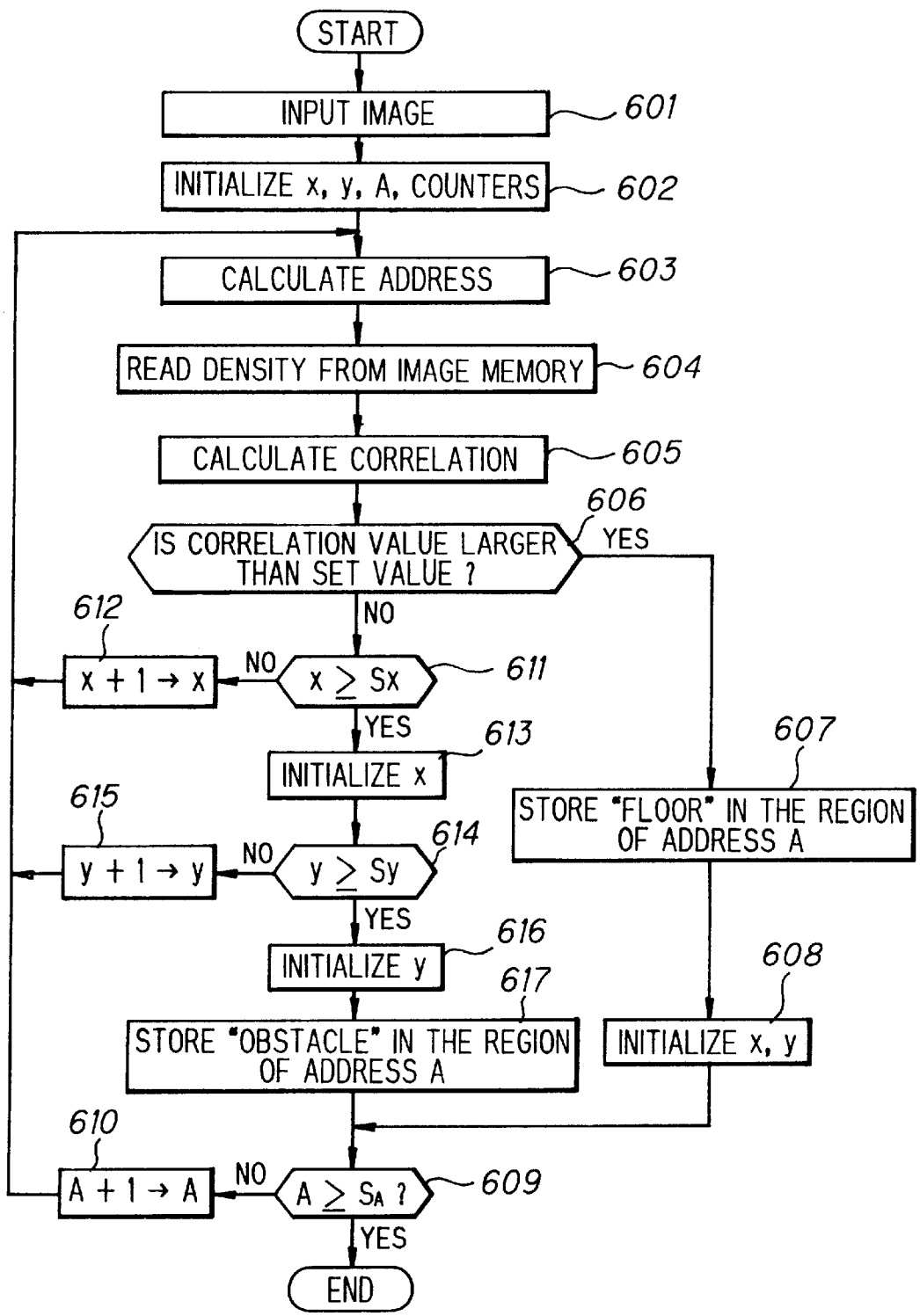
FIG. 19 is a flow chart of a floor/obstacle judgement process in the fourth embodiment.

FIG. 19 is a flow chart of a floor/obstacle judgement process in the fourth embodiment.

An analog image taken by the camera 11 is converted into a digital image and stored in the image memory 13 (step 601). The CPU 18 initializes the data (returns the data to 0) in the region address register 14a, the x-address register 14b and the y-address register 14c (step 602). The address generator 14d calculates the address of a pixel in the image memory 13 by using the addresses A, x and y in the respective registers 14a to 14c (step 603), and the density of the pixel read from the address is input to the accumulator 15 (step 604). The accumulator 15 calculates the absolute value of the difference between the input density and the set density g (=0) and accumulates the absolute value (step 605).

The floor/obstacle judging portion 16 then compares the accumulated value R with the set value Rs (step 606), and if the accumulated value R is larger than the set value Rs, the floor/obstacle judging portion 16 judges the target region to be a floor region and reports the fact to the processor 18. When the processor 18 receives the report, the processor 18 supplies a data storage enable signal to the floor/obstacle judging portion 16. The floor/obstacle judging portion 16 stores "1"(=floor) in the storage area of the storage portion 17 designated by the region address A (step 607).

The processor 18 then initializes the x- and y-addresses (step 608), and judges whether or not $A \geq S_A$ (=63) (step 609). If $A<S_A$, 1 is added to the region address A (A+1→A) (step 610), and the process is repeated from the step 603 and onward.

If the accumulated value R is not larger than the set value Rs at the step 606, the processor 18 judges whether or not $x \geq Sx$ (=63) (step 611), and if x<Sx, 1 is added to x (x+1→x) (step 612), and the process is repeated from the step 603 and onward. When x becomes equal to Sx after the repetition of the process, x is initialized (step 613), and judgement is made as to whether or not $y \geq Sy$ (=63) (step 614). If y<Sy, 1 is added to y (y+1→y) (step 615), and the process is repeated from the step 603 and onward.

When y becomes equal to Sy before R becomes larger than Rs, y is initialized (step 616), and the target region is judged to be an obstacle region, so that "0" (obstacle) is stored in the storage area of the storage portion 17 designated by the region address A (step 617).

Thereafter, judgement is made as to whether or not $A \geq S_A$ (=63) (step 609). If $A<S_A$, 1 is added to A (A+1→A) (step 610), and the process is repeated from the step 603 and onward.

When $A=S_A$, the floor/obstacle judgement process for all the regions is finished. That is, the extraction of the floor and obstacles from the image taken by the camera is finished.

In this manner, since the amount of computation is reduced, it is possible to extract a floor region/obstacle region at a higher speed.

In the above-described embodiment, the absolute value of the difference in the density value between each pixel in a region and the set density is calculated and accumulated. The set value Rs is compared with the accumulated value R every time the accumulated value is obtained, and when the accumulated value exceeds the set value, the region is judged to be a floor region, while when the accumulated value for all the pixels is smaller than the set value, the region is judged to be an obstacle region. Alternatively, it is possible to compare the set value with the accumulated value of the difference between the density of a pixel and the average density every time the accumulated value is obtained. In this case, when the accumulated value is larger than the set value, the floor/obstacle judging portion 16 judges that the corresponding region is an obstacle region. On the other hand, when the accumulated value of absolute values for all the pixels is smaller than the set value, the floor/obstacle judging portion 17 judges that the corresponding region is a floor region.

As described above, according to the present invention, an image which is taken by a camera is divided into a plurality of regions and the absolute value of the difference between the density data of each pixel in a region and a set density (e.g., Rs density 0) is calculated and accumulated. The set value Rs is compared with the accumulated value R of the absolute values for all the pixels within a target region or the average value of the accumulated value obtained by dividing the accumulated value by the number of pixels, and whether the target region is a floor region or an obstacle region is judged on the basis of the result of the comparison. The result of the judgement is stored in the storage portion. It is thus possible to extract a floor region and an obstacle region from the image taken by a camera, by simple processing at a high speed.

According to the present invention, an image taken by a camera is divided into a plurality of regions and the average density of each region is calculated. The absolute value of the difference between the density of each pixel of each region and the average density of the corresponding region is calculated and accumulated. A set value is compared with the accumulated value of the absolute values for all the pixels in a target region or the average value obtained by dividing the accumulated value by the number of pixels and whether the target region is a floor region or an obstacle region is judged on the basis of the result of the comparison. The result of the judgement is stored in the storage portion. It is therefore possible to extract a floor region and an obstacle region from the image taken by a camera, by simple processing at a high speed.

Furthermore, according to the present invention, an image taken by a camera is divided into a plurality of regions and each region is further divided into a plurality of subregions. When a target region is judged to be a floor region as a result of floor/obstacle region judgement, all the subregions that constitute the target region are judged to be floor regions. On the other hand, when the target region is judged to be an obstacle region, the floor/obstacle region judgement process is executed for each subregion which constitutes the target region. It is therefore possible to extract a floor region and an obstacle region at a higher speed in proportion to the areal ratio of a floor region in an image.

In addition, since the number of pixels in a target region for correlation calculation is reduced by thinning the pixels in the floor/obstacle judgment process for the target region, it is possible to reduce the amount of computation and to extract a floor region/obstacle region at a higher speed.

According to the present invention, every time the accumulated value R is obtained, it is compared with the set value Rs, and when the accumulated value exceeds the set value, the target region is judged to be a floor region. On the other hand, when the accumulated value for all the pixels is smaller than the set value, the target region is judged to be an obstacle region. It is therefore possible to begin accumulation for the next region immediately after the target region is judged to be a floor region. Thus, it is possible to reduce the amount of computation and to extract a floor region/obstacle region at a higher speed.

In addition, according to the present invention, the set value is compared with the accumulated value of the difference between the density of a pixel and the average density every time the accumulated value is obtained. When the accumulated value is larger than the set value, the target region is judged to be an obstacle region, while when the accumulated value of absolute values for all the pixels is smaller than the set value, the target region is judged to be a floor region. It is therefore possible to begin accumulation for the next region immediately after the target region is judged to be an obstacle region. Thus, it is possible to reduce the amount of computation and to extract a floor region/obstacle region at a higher speed.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus to extract a floor region and an obstacle region from an image formed by pixels, comprising:

an image dividing means to divide the image, taken by a single camera, into a plurality of regions;

an arithmetic unit to calculate an absolute value of a difference between a density of each pixel of each region and a set density to accumulate the absolute values for each region;

a floor/obstacle judging portion to judge whether a target region is a floor region or an obstacle region on the basis of a comparison between a set value and an accumulated value of the absolute values for the pixels within the target region or an average value obtained by dividing the accumulated value of the absolute values for the pixels within the target region by the number of pixels; and a storage portion to store a result of said floor/obstacle judging portion.

2. An image processing apparatus according to claim 1, wherein the set value has a density equal to 0.

3. An image processing apparatus according to claim 1, further comprising:

a region dividing means to further divide each of the regions into a plurality of subregions;

wherein said floor/obstacle judging portion judges all the subregions that constitute the target region to be floor regions when the target region is judged to be a floor region, and executes said floor/obstacle judging portion for each of the subregions when the target region is judged to be an obstacle region.

4. An image processing apparatus according to claim 3, wherein said arithmetic unit thins pixels in the target region which are used for the calculation of the accumulated value in said floor/obstacle judging portion for the target region.

5. An image processing apparatus to extract a floor region and an obstacle region from an image formed by pixels, comprising:

an image dividing means to divide the image, taken by a single camera, into a plurality of regions;

an average density calculator to calculate an average density of each region by dividing an accumulated value of densities of all pixels in each region by the number of pixels in the region;

an arithmetic unit to calculate an absolute value of the difference between the density of each pixel of each region and the average density of the corresponding region to accumulate the absolute values;

a floor/obstacle judging portion to judge whether a target region is a floor region or an obstacle region on the basis of a comparison between a set value and an accumulated value of the absolute values for all the pixels within the target region or an average value obtained by dividing the accumulated value of the absolute values for all the pixels within the target region by the number of pixels; and a storage portion to store a result of said floor/obstacle judging portion.

6. An image processing apparatus according to claim 5, further comprising:

a region dividing means to further divide each of the regions into a plurality of subregions;

wherein said floor/obstacle judging portion judges all the subregions that constitute the target region to be floor regions when the target region is judged to be a floor region, and executes said floor/obstacle judging portion for each of the subregions when the target region is judged to be an obstacle region.

7. An image processing apparatus according to claim 6, wherein said arithmetic unit thins pixels in the target region which are used for the calculation of the accumulated value in said floor/obstacle judging portion for the target region.

8. An image processing apparatus to extract a floor region and an obstacle region from an image formed by pixels, comprising:

an image dividing means to divide the image, taken by a single camera, into a plurality of regions;

an arithmetic unit to calculate an absolute value of a difference between a density of each pixel of each region and a set density and to calculate an accumulated value of the absolute value every time the absolute value is calculated for each region;

a floor/obstacle judging portion to compare a set value with the accumulated value of the absolute value every time the accumulated value of the absolute value is calculated, to judge a target region to be a floor region when the accumulated value of the absolute exceeds the set value, and to judge the target region to be an obstacle region when the accumulated value of the absolute value for all the pixels in the target region is smaller than the set value; and a storage portion to store a result of said floor/obstacle judging portion;

wherein said arithmetic unit begins accumulation for the next region when the target region is judged to be a floor region or an obstacle region.

9. An image processing apparatus to extract a floor region and an obstacle region from an image formed by pixels, comprising:

an image dividing means to divide the image, taken by a single camera, into a plurality of regions;

an average density calculator to calculate an average density of each region by dividing the sum of densities of all pixels in each region by the number of pixels in the region;

an arithmetic unit to calculate an absolute value of the difference between the density of each pixel of each region and the average density of the corresponding region and to calculate an accumulated value of the absolute value every time the absolute value is calculated for each region;

a floor/obstacle judging portion to compare a set value with the accumulated value of the absolute value every time the accumulated value of the absolute value is calculated, and to judge a target region to be an obstacle region when the accumulated value of the absolute value exceeds the set value, and to judge the target region to be a floor region when the accumulated value of the absolute value for all the pixels in the target region is smaller than the set value; and a storage portion to store a result of said floor/obstacle judging portion;

wherein said arithmetic unit begins accumulation for a next region when the target region is judged to be a floor region or an obstacle region.

10. An image processing apparatus extracting a floor region and an obstacle region from an image formed by pixels, comprising:

an image divider dividing the image, taken by a single camera, into a plurality of regions;

an arithmetic unit calculating an absolute value of a difference between a density of each pixel of each region and a set density, said arithmetic unit accumulating the absolute values for each region; and a floor/obstacle judging portion judging whether a target region is a floor region or an obstacle region by comparing a set value and an accumulated value of the absolute values for the pixels within the target region or an average value obtained by dividing the accumulated value of the absolute values for the pixels within the target region by the number of pixels.

11. An image processing apparatus extracting a floor region and an obstacle region from an image formed by pixels, comprising:

an image divider dividing the image, taken by a single camera, into a plurality of regions;

an arithmetic unit calculating an absolute value of a difference between a density of each pixel of each region and a set density to accumulate the absolute values for each region; and a judging portion judging whether a target region is a floor region or an obstacle region on the basis of a comparison between a set value and an accumulated value of the absolute values for the pixels within the target region or an average value obtained by dividing the accumulated value of the absolute values for the pixels within the target region by the number of pixels.

12. An image processing apparatus to extract a floor region and an obstacle region from an image formed by a plurality of pixels, comprising:

image dividing means for dividing the image, taken by a single camera, into a plurality of regions;

reference image storing means for storing a reference image having a same size as each of the plurality of regions;

an arithmetic unit to calculate an absolute value of a difference between a density of each pixel of each region and a density of each corresponding pixel of the reference image to accumulate absolute values for each region;

a floor/obstacle judging portion to judge whether a target region is a floor region or an obstacle region on the basis of a comparison between a set value and an accumulated value of the absolute values for the pixels within the target region or an average value obtained by dividing the accumulated value of the absolute values for the pixels within the target region by the number of pixels; and a storage portion to store a result of said floor/obstacle judging portion.

13. An image processing apparatus according to claim 12, wherein the densities of all the pixels in said reference image are constant.

14. An image processing apparatus to extract a floor region and an obstacle region from an image formed by a plurality of pixels, comprising:

image dividing means for dividing the image, taken by a single camera, into a plurality of regions;

reference image storing means for storing a reference image having a same size as each region;

an arithmetic unit to calculate an absolute value of a difference between a density of each pixel of each region and a density of each corresponding pixel of the reference image and to calculate an accumulated value of the absolute value every time the absolute value is calculated for each region;

a floor/obstacle judging portion to compare a set value with the accumulated value of the absolute value every time the accumulated value of the absolute value is calculated, to judge a target region to be a floor region when the accumulated value of the absolute exceeds the set value, and to judge the target region to be an obstacle region when the accumulated value of the absolute value for all the pixels in the target region is smaller than the set value; and a storage portion to store a result of said floor/obstacle judging portion, wherein said arithmetic unit begins accumulation for the next region when the target region is judged to be a floor region or an obstacle region.

15. An image processing apparatus according to claim 14, wherein the densities of all the pixels in said reference image are constant.

* * * * *